US012441958B2

(12) United States Patent
Kita et al.

(10) Patent No.: US 12,441,958 B2
(45) **Date of Patent: *Oct. 14, 2025**

(54) METHOD FOR TREATING TEXTILE PRODUCT

(71) Applicant: KAO CORPORATION, Tokyo (JP)

(72) Inventors: Ayako Kita, Wakayama (JP); Yoshinori Otani, Wakayama (JP); Yuna Muneyuki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 18/269,313

(22) PCT Filed: Dec. 23, 2021

(86) PCT No.: PCT/JP2021/047860

§ 371 (c)(1),
(2) Date: Jun. 23, 2023

(87) PCT Pub. No.: WO2022/138818

PCT Pub. Date: Jun. 30, 2022

(65) Prior Publication Data

US 2024/0060005 A1 Feb. 22, 2024

(30) Foreign Application Priority Data

Dec. 25, 2020 (JP) ................................ 2020-217302
Dec. 25, 2020 (JP) ................................ 2020-217303

(51) Int. Cl.
*C11D 1/14* (2006.01)
*C11D 1/72* (2006.01)
*C11D 1/83* (2006.01)

(52) U.S. Cl.
CPC ................ *C11D 1/143* (2013.01); *C11D 1/72* (2013.01); *C11D 1/83* (2013.01); *C11D 2111/12* (2024.01)

(58) Field of Classification Search
CPC ......... C11D 3/3409; C11D 1/143; C11D 1/37; C11D 3/43; C11D 1/72; C11D 1/8305; C11D 1/123; C11D 1/29; C11D 2111/12; C11D 3/20; C11D 1/83; C11D 1/831; D06L 1/12; D06L 1/20; D06M 13/224; D06M 13/17; D06M 13/256
See application file for complete search history.

(56) References Cited

U.S. PATENT DOCUMENTS

| | | | |
|---|---|---|---|
| 4,434,087 | A | 2/1984 | Hampson et al. |
| 6,048,831 | A | 4/2000 | Mori et al. |
| 8,454,709 | B2 | 6/2013 | Man et al. |
| 9,877,906 | B2 | 1/2018 | Doi et al. |
| 2007/0214999 | A1 | 9/2007 | Meyer et al. |
| 2014/0076344 | A1 | 3/2014 | Doi et al. |
| 2017/0281498 | A1 | 10/2017 | Yoshikawa et al. |
| 2019/0169536 | A1 | 6/2019 | Tabuchi et al. |

FOREIGN PATENT DOCUMENTS

| | | | | |
|---|---|---|---|---|
| CN | 102712563 | A | 10/2012 | |
| CN | 106833925 | A | 6/2017 | |
| CN | 109072129 | A | 12/2018 | |
| CN | 109679778 | A | 4/2019 | |
| EP | 0365170 | A1 | 4/1990 | |
| EP | 2899258 | A1 | 7/2015 | |
| EP | 3467081 | A1 * | 4/2019 | ........... C07C 229/16 |
| EP | 3498811 | A1 | 6/2019 | |
| JP | S5753600 | A | 3/1982 | |
| JP | S62-195096 | A | 8/1987 | |
| JP | H02-182967 | A | 7/1990 | |
| JP | H03-153798 | A | 7/1991 | |
| JP | H08325935 | A | 12/1996 | |
| JP | 2005154505 | A | 6/2005 | |
| JP | 2010126561 | A | 6/2010 | |

(Continued)

OTHER PUBLICATIONS

English translation of the International Preliminary Report on Patentability and Written Opinion issued Jul. 6, 2023 in PCT/JP2021/047860, 7 pages.

International Search Report issued Mar. 1, 2022 in PCT/JP2021/047860 (with English translation), 4 pages.

J. Stapersma et al, "Hydroxy Alkane Sulfonate (HAS), a New Surfactant Based on Olefins", J. Am. Oil Chem. Soc., vol. 69, 1992, pp. 39-43.

Extended European Search Report issued Dec. 23, 2024, in corresponding European Patent Application No. 21910957.6, 10 pages.

(Continued)

*Primary Examiner* — Vishal V Vasisth
(74) *Attorney, Agent, or Firm* — Element IP, PLC

(57) ABSTRACT

A method for treating a textile product including, treating the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with a predetermined number of carbons or a salt thereof, and component (b): one or more surfactants selected from the following components (b1) and (b2), component (b1): an anionic surfactant (excluding component (a)), and component (b2): a predetermined nonionic surfactant, wherein the treatment liquid satisfies any of the following requirements (1) and (2), requirement (1): content proportion (a)/[(a)+(b1)] is more than 0 mass % and 50 mass % or less, and requirement (2): content proportion (a)/[(a)+(b2)] is more than 0 mass % and 45 mass % or less.

8 Claims, No Drawings

(56) References Cited

FOREIGN PATENT DOCUMENTS

| | | | | |
|---|---|---|---|---|
| JP | 2011190554 | A | | 9/2011 |
| JP | 2014076988 | A | | 5/2014 |
| JP | 2015028123 | A | | 2/2015 |
| JP | 2015120984 | A | * | 7/2015 |
| JP | 2018066102 | A | | 4/2018 |
| JP | 2020063435 | A | | 4/2020 |
| WO | WO-1998024865 | A1 | | 6/1998 |
| WO | WO-2015125753 | A1 | | 8/2015 |
| WO | WO-2016196555 | A1 | | 12/2016 |
| WO | WO-2017204149 | A1 | | 11/2017 |
| WO | WO-2018030328 | A1 | | 2/2018 |
| WO | WO-2021187488 | A1 | | 9/2021 |

OTHER PUBLICATIONS

Extended European Search Report issued Mar. 17, 2025, in corresponding European Patent Applicaiton No. 21910959.2, 11 pages.

English translation of the International Preliminary Report on Patentability and Written Opinion issued Jul. 6, 2023, in PCT/JP2021/047861, 7 pages.

English translation of the International Preliminary Report on Patentability and Written Opinion issued Jul. 6, 2023, in PCT/JP2021/047862, 6 pages.

International Search Report issued Mar. 1, 2022, in PCT/JP2021/047861 (with English translation), 6 pages.

International Search Report issued Mar. 1, 2022, in PCT/JP2021/047862 (with English translation), 5 pages.

Office Action mailed Oct. 18, 2024, in co-pending U.S. Appl. No. 18/267,876.

Office Action mailed Oct. 18, 2024, in co-pending U.S. Appl. No. 18/268,654.

Combined Chinese Office Action and Search Report issued Apr. 3, 2025, in corresponding Chinese Patent Application No. 202180087407.0 (with partial English translation), 13 pages.

* cited by examiner

METHOD FOR TREATING TEXTILE PRODUCT

This application is a 371 of PCT/JP2021/047860 filed Dec. 23, 2021

FIELD OF THE INVENTION

The present invention relates to a method for treating a textile product, a method for washing a textile product and a foaming reducing method.

BACKGROUND OF THE INVENTION

Conventionally, in the washing of textile products, detergent compositions excellent in washing performance and foaming have been preferably used. However, depending on the washing equipment or washing method, foam control is also an important factor for preventing formed foam from overflowing during washing. For example, in drum-type washing machines, if detergents are at high concentrations due to water-saving, foam control may be needed so as to prevent excessive foam formation. Further, also depending on the structure of a drainage system such as a trap structure, foam control may be necessary for preventing foam from overflowing. Foam control may be needed not only in the washing of textile products, but also in various treatments, for example, finishing, dyeing, bleaching, starching, softening and other treatments of textile products.

JP-A S62-195096 discloses a homogeneous concentrated aqueous liquid detergent composition containing, an alk(en)yl succinate having an alk(en)yl radical having a predetermined number of C-atoms, and a sulfonated surface-active agent having a predetermined critical micelle concentration.

JP-A H2-182967 discloses a method of laundering fabrics including, laundering the fabric in an aqueous liquor which is a solution of surfactant system containing a mixture of a dialkylsulphosuccinate having predetermined alkyl substituent groups and a nonionic surfactant, the said aqueous liquor containing an electrolyte so as to have a predetermined ionic strength.

WO-A 2018/030328 discloses a surfactant composition including, (A) an internal olefin sulfonate, (B) an anionic surfactant other than component (A), (C) a nonionic surfactant and (D) water at a predetermined proportion.

JP-A H3-153798 discloses a low-irritant detergent composition including, (A) a sulfosuccinic acid-type anionic surfactant and (B) a nonionic surfactant.

SUMMARY OF THE INVENTION

The present invention is aimed at providing a novel method for treating a textile product which maintains produced foam in a moderate manner without hindering washing and other treatments when the treatments are carried out.

The present invention relates to a method for treating a textile product including, treating the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein the treatment liquid satisfies at least one of the following requirements (1) and (2), requirement (1): a proportion of a content of component (a) to a total content of components (a) and (b1) in the treatment liquid is more than 0 mass % and 50 mass % or less, and requirement (2): a proportion of a content of component (a) to a total content of components (a) and (b2) in the treatment liquid is more than 0 mass % and 45 mass % or less.

Further, the present invention relates to a method for washing a textile product including, washing the textile product with a treatment liquid and thereafter rinsing the textile product with water, the treatment liquid being obtained by mixing components (a) and (b) with water containing a hardness component, provided that the treatment liquid does not include a total of 100 ppm or more of a dicarboxylic acid with 14 or more and 16 or less carbons and a salt thereof, wherein the treatment liquid satisfies at least one of the above requirements (1) and (2).

Further, the present invention relates to a foaming reducing method for reducing foaming of a treatment liquid during treatment of a textile product with the treatment liquid, the treatment liquid being obtained by mixing components (a) and (b) with water containing a hardness component, provided that the treatment liquid does not include a total of 100 ppm or more of a dicarboxylic acid with 14 or more and 16 or less carbons and a salt thereof, wherein components (a) and (b) are used such that at least one of the above requirements (1) and (2) is satisfied.

The present invention can provide a method for treating a textile product which can maintain produced foam in a moderate manner without hindering washing and other treatments when the treatments are carried out.

EMBODIMENTS OF THE INVENTION

The mechanism by which the method for treating a textile product of the present invention can maintain produced foam in a moderate manner without hindering treatments of textile products is uncertain, but is inferred to be as follows. Component (a) is considered to create an association state called a vesicle in a specific concentration region even in the absence of hardness components. It is considered that, in this association state, component (a) is so hydrophobic that an anti-foaming effect is exhibited. It is considered that, when hardness components are further added thereto, increased amounts of hydrated solids are formed, allowing a higher anti-foaming effect to be exhibited. Further, it is considered that, when components (a) and (b) satisfy a predetermined requirement, the hydrated solids formed by component (a) and hardness components in water (for example, calcium ions) act on foam formed by water and component (b) and break this foam without hindering treatments with component (b). Note that the acting mechanism of the method for treating a textile product of the present invention is not limited thereto. Further, maintaining produced foam in a moderate manner in the present invention may include not only suppressing generation of foam, but also quickly eliminating generated foam.

First, a treatment liquid used in the method for treating a textile product of the present invention (hereinafter referred to as the treatment liquid of the present invention) is explained. Note that, in the following explanation, the method for treating a textile product of the present invention will be explained by giving an example in which a washing treatment of a textile product is carried out, but it can be applied to not only washing treatments, but also, for example, finishing, dyeing, bleaching, starching, softening and other treatments of textile products.

The treatment liquid of the present invention contains the following component (a), the following component (b) and water containing a hardness component such that a predetermined requirement is satisfied, provided that the treatment liquid of the present invention does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate.

The treatment liquid of the present invention may be a treatment liquid obtained by mixing components (a) and (b) with water containing a hardness component.

Component (a) is a sulfosuccinic acid ester having a hydrocarbon group with 5 or more and 18 or less carbons or a salt thereof. Component (a) may be a sulfosuccinic acid monoester or a sulfosuccinic acid diester, and is preferably a sulfosuccinic acid diester or a salt thereof.

Examples of a hydrocarbon group of component (a) include an alkyl group and an alkenyl group, and an alkyl group is preferable from the viewpoint of foam suppressing performance. The hydrocarbon groups of component (a) each independently have 5 or more, preferably 6 or more, more preferably 8 or more and further preferably 10 or more carbons from the viewpoint of foam suppressing performance, and 18 or less, preferably 15 or less and more preferably 12 or less carbons from the viewpoint of washing performance. Further, a hydrocarbon group of component (a) may be either a straight chain or a branched chain, and is preferably branched from the viewpoint of foam suppressing performance.

From the viewpoints of washing performance and foam suppressing performance, component (a) is preferably a sulfosuccinic acid diester having two hydrocarbon groups with 5 or more and 18 or less carbons or a salt thereof, and examples include, for example, a compound represented by the following general formula (a1).

Note that a content of component (a) in the present invention is calculated by assuming that component (a) is a sodium salt.

(a1)

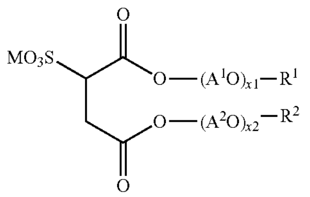

wherein $R^1$ and $R^2$ each represent a hydrocarbon group with 5 or more and 18 or less carbons, $A^1O$ and $A^2O$ each represent an alkyleneoxy group with 2 or more and 4 or less carbons, x1 and x2 each represent an average number of added moles of $A^1O$ or $A^2O$, which is a number of 0 or more and 10 or less, and M represents a cation.

$R^1$ and $R^2$ in the general formula (a1) may be the same of different, and each represent a hydrocarbon group with 5 or more and 18 or less carbons. Examples of the hydrocarbon group include an alkyl group and an alkenyl group. $R^1$ and $R^2$ are preferably alkyl groups from the viewpoint of foam suppressing performance.

The hydrocarbon groups of $R^1$ and $R^2$ in the general formula (a1) each have 5 or more, preferably 6 or more, more preferably 8 or more and further preferably 10 or more carbons from the viewpoint of foam suppressing performance, and 18 or less, preferably 15 or less and more preferably 12 or less carbons from the viewpoint of washing performance.

$R^1$ and $R^2$ in the general formula (a1) have preferably 12 or more, more preferably 16 or more and further preferably 20 or more, and preferably 30 or less and more preferably 24 or less carbons in total from the viewpoint of foam suppressing performance. Here, when the treatment liquid contains two or more compounds with different total numbers of carbons in $R^1$ and $R^2$ as component (a1), the total number of carbons in $R^1$ and $R^2$ of the entire component (a1) represents the molar average of the total numbers of carbons in $R^1$ and $R^2$ of those compounds.

The hydrocarbon groups of $R^1$ and $R^2$ in the general formula (a1) may each be either a straight chain or a branched chain, but are preferably branched from the viewpoint of foam suppressing performance. The branched hydrocarbon groups of $R^1$ and $R^2$ preferably have a side chain with 2 or more carbons and more preferably have a side chain with 3 or more carbons from the viewpoint of foam suppressing performance. They may have a side chain with 8 or less and further 6 or less carbons. Note that, in each of the hydrocarbon groups of $R^1$ and $R^2$, when the longest array of carbons is referred to as the main chain with a carbon bonded to an oxygen atom (O) in the formula as the first carbon, and the carbon number of the main chain is represented as X (X is 3 or more because $R^1$ and $R^2$ each have 5 or more carbons), a hydrocarbon group bonded to any of the first to the X-1 carbons in the main chain is referred to as a side chain.

The hydrocarbon groups of $R^1$ and $R^2$ in the general formula (a1) may be either saturated or unsaturated.

At least one of $R^1$ and $R^2$ in the general formula (a1) preferably has a branched structure.

The hydrocarbon groups of $R^1$ and $R^2$ in the general formula (a1) more preferably include a saturated branched hydrocarbon group from the viewpoint of foam suppressing performance.

Further, the hydrocarbon groups of $R^1$ and $R^2$ may be groups derived from Guerbet alcohols from the viewpoints of foam suppressing performance and availability.

$R^1$ and $R^2$ in the general formula (a1) each independently represent preferably a branched alkyl group with 8 or more and 12 or less carbons, more preferably a branched alkyl group with 8 or more and 10 or less carbons and further preferably a branched alkyl group with 10 carbons from the viewpoint of foam suppressing performance.

In the present invention, an open-chain branched hydrocarbon group such as a branched alkyl group or the like includes a hydrocarbon residue left over after the removal of a hydroxyl group from a secondary alcohol.

When $R^1$ and $R^2$ each represent a branched alkyl group with 8 or more and 12 or less carbons, they have a side chain which may be constituted of the same or different total numbers of carbons, and which is constituted of preferably 1 or more and more preferably 2 or more, and preferably 4 or less, more preferably 3 or less and further preferably 3 carbons from the viewpoint of foam suppressing performance.

In the present invention, the total number of carbons constituting a side chain refers to the total of the carbon numbers of all the side chains other than the main chain in one branched alkyl group, and when there is a plurality of side chains, it refers to the total of the carbon numbers of all those side chains.

$R^1$ and $R^2$ may have the same number or different numbers of side chains, and have 1 or more, and preferably 3 or less and more preferably 2 or less side chains from the viewpoint of foam suppressing performance. $R^1$ and $R^2$ each have preferably 1 side chain from the viewpoint of foam suppressing performance.

In the present invention, the number of side chains refers to the number of side chains branching off from a main chain, and even if a side chain further has a side chain branching off from the side chain, the number of side chains remains the same. However, while a side chain may further have a side chain branching off from the side chain, the side chain is preferably a straight chain from the viewpoint of foam suppressing performance.

When $R^1$ and $R^2$ each independently represent a branched alkyl group with 8 or more and 12 or less carbons, $R^1$ and $R^2$ may have the same number or different numbers of branch carbons, and have 1 or more, and preferably 3 or less and more preferably 2 or less branch carbons from the viewpoint of foam suppressing performance. $R^1$ and $R^2$ each have preferably 1 branch carbon from the viewpoint of foam suppressing performance. In the present invention, the number of branch carbons refers to the total of the number of tertiary carbon atoms and the number of quaternary carbon atoms in a branched alkyl group.

In a more preferable aspect, $R^1$ and $R^2$ are branched alkyl groups with 8 or more and 12 or less carbons, wherein the branched alkyl groups each independently have a main chain with 6 or more and 8 or less carbons, each independently have a side chain constituted of preferably 1 or more and more preferably 2 or more, and preferably 4 or less, more preferably 3 or less and further preferably 3 carbons, and each independently have preferably 3 or less, more preferably 2 or less and further preferably 1 side chain from the viewpoint of foam suppressing performance.

$R^1$ and $R^2$ each represent preferably a branched alkyl group selected from a branched octyl group, a branched decyl group and a branched dodecyl group from the viewpoint of foam suppressing performance, and more preferably a branched decyl group from the viewpoint of foam suppressing performance. Examples of a branched octyl group include 2-ethylhexyl group or the like. Examples of a branched decyl group include 2-propylheptyl group, a group derived from a decyl alcohol manufactured by KH Neochem Co., Ltd. or the like, and 2-propylheptyl group is preferable. Examples of a branched dodecyl group include 2-butyloctyl group or the like.

The hydrocarbon groups of $R^1$ and $R^2$ in the general formula (a1) may be the same or different. The case where the hydrocarbon groups of $R^1$ and $R^2$ are different is preferable from the viewpoint of foam suppressing performance. Further, the case where the hydrocarbon groups of $R^1$ and $R^2$ are the same is preferable from the viewpoints of foam suppressing performance and quality stability. For example, $R^1$ and $R^2$ in the general formula (a1) may have the same number or different numbers of carbons. The case where $R^1$ and $R^2$ have different numbers of carbons is preferable from the viewpoint of foam suppressing performance. Further, the case where $R^1$ and $R^2$ have the same number of carbons is preferable from the viewpoints of foam suppressing performance and quality stability.

The hydrocarbon groups of $R^1$ and $R^2$ in the general formula (a1) have a degree of branching defined by the following formula of preferably 0.3 or less, more preferably 0.2 or less, further preferably 0.1 or less and furthermore preferably 0.08 or less from the viewpoint of foam suppressing performance, and preferably 0.01 or more, more preferably 0.02 or more and further preferably 0.04 or more from the viewpoint of foam suppressing performance.

Degree of branching=[(total number of terminal methyl groups in $R^1$and $R^2$)−2]/(total number of carbons in $R^1$and $R^2$)

Note that a degree of branching is an average value that can be measured with $^1$H-NMR.

$A^1O$ and $A^2O$ in the general formula (a1) each represent an alkyleneoxy group with 2 or more and 4 or less carbons, and preferably with 2 or 3 carbons from the viewpoint of foam suppressing performance. x1 and x2 in the general formula (a1) represent average numbers of added moles of $A^1O$ and $A^2O$, and each represent a number of 0 or more and 10 or less, and from the viewpoint of foam suppressing performance, preferably 6 or less, more preferably 4 or less and further preferably 2 or less, and furthermore preferably 0.

M in the general formula (a1) represents a cation. M is preferably a cation other than a hydrogen ion. Examples of M include, for example, an alkali metal ion such as a lithium ion, a sodium ion, a potassium ion or the like, an alkaline earth metal ion such as a magnesium ion, a calcium ion, a barium ion or the like, an organic ammonium ion such as a triethanolammonium ion, a diethanolammonium ion, a monoethanolammonium ion, a trimethylammonium ion, a monomethylammonium ion or the like, and others.

M is preferably an alkali metal ion or an alkanol ammonium ion, more preferably a sodium ion, a potassium ion, a triethanolammonium ion, a diethanolammonium ion or a monoethanolammonium ion and further preferably a sodium ion from the viewpoint of foam suppressing performance.

Component (b) is one or more surfactants selected from components (b1) and (b2) (excluding component (a)). Component (b) is preferably component (b2) from the viewpoint of washing performance.

Component (b1) is an anionic surfactant (excluding component (a)). Component (b1) is preferably one or more compounds selected from compound (b1-1) represented by the following general formula (b1-1) [hereinafter referred to as component (b1-1)], compound (b1-2) represented by the following general formula (b1-2) [hereinafter referred to as component (b1-2)], compound (b1-3) represented by the following general formula (b1-3) [hereinafter referred to as component (b1-3)] and an internal olefin sulfonate with 14 or more and 24 or less carbons [hereinafter referred to as component (b1-4)].

Component (b1) is preferably one or more compounds selected from components (b1-1), (b1-3) and (b1-4) and more preferably one or more compounds selected from components (b1-1) and (b1-4) from the viewpoint of washing performance. Component (b1) is preferably one or more compounds selected from components (b1-1) and (b1-4) from the viewpoint of foam suppressing performance.

$$R^{1b}—O—[(PO)_m(EO)_n]—SO_3M \quad (b1\text{-}1)$$

wherein in the formula (b1-1), $R^{1b}$ represents an alkyl group with 8 or more and 22 or less carbons, in which a carbon atom bonded to the oxygen atom is a primary carbon atom, PO represents a propyleneoxy group, EO represents an ethyleneoxy group, EO and PO are bonded in blocks or bonded at random, PO and EO are bonded in an arbitrary order, m and n represent average numbers of added moles of PO and EO, where m is 0 or more and 5 or less and n is 0 or more and 16 or less, and M represents a hydrogen atom, an alkali metal, an alkaline earth metal (½ atom), ammonium or an organic ammonium.

Note that a content of component (b1-1) in the present invention is calculated by assuming that component (b1-1) is a sodium salt.

$$R^{2b}—B—SO_3M \quad (b1\text{-}2)$$

wherein in the formula (b1-2), $R^{2b}$ represents an alkyl group with 9 or more and 21 or less carbons, B represents a benzene ring, a carbon atom of $R^{2b}$ bonded to a carbon atom of B is a secondary carbon atom, M represents a hydrogen atom, an alkali metal, an alkaline earth metal (½ atom), ammonium or an organic ammonium, and a sulfonic acid group is bonded in an ortho, meta or para position relative to $R^{2b}$ bonded to B.

Note that a content of component (b1-2) in the present invention is calculated by assuming that component (b1-2) is a sodium salt.

$$R^{3b}—CH(SO_3M)COOR^{4b} \quad (b1\text{-}3)$$

wherein in the formula (b1-3), $R^{3b}$ represents an alkyl group with 6 or more and 20 or less carbons, $R^{4b}$ represents an alkyl group with 1 or more and 6 or less carbons, and M represents a hydrogen atom, an alkali metal, an alkaline earth metal (½ atom), ammonium or an organic ammonium.

Note that a content of component (b1-3) in the present invention is calculated by assuming that component (b1-3) is a sodium salt.

The internal olefin sulfonate of component (b1-4) is a sulfonate obtained by sulfonating, neutralizing and hydrolyzing an internal olefin (olefins having the double bond inside the olefin chain) with 14 or more and 24 or less carbons as a raw material. Such an internal olefin also includes those containing trace amounts of so-called alfa olefins (hereinafter also referred to as α-olefins) in which the position of the double bond is present at position 1 of the carbon chain. Further, if internal olefins are sulfonated, β-sultones are quantitatively produced, and part of β-sultones change into γ-sultones and olefin sulfonic acids, which are further converted into hydroxy alkane sulfonates and olefin sulfonates in neutralization and hydrolysis processes (for example, J. Am. Oil Chem. Soc. 69, 39 (1992)). Here, the obtained hydroxy alkane sulfonates have the hydroxy group inside the alkane chain, and the olefin sulfonates have the double bond inside the olefin chain. Further, the obtained product is mainly a mixture of them, and may also partially include trace amounts of hydroxy alkane sulfonates having the hydroxy group at the end of the carbon chain or olefin sulfonates having the double bond at the end of the carbon chain.

In the present specification, each of these products and a mixture of them are collectively referred to as an internal olefin sulfonate (component (b1-4)). Further, the hydroxy alkane sulfonates are referred to as hydroxy species of an internal olefin sulfonate (hereinafter also referred to as HAS species), and the olefin sulfonates are referred to as olefin species of an internal olefin sulfonate (hereinafter also referred to as IOS species).

As is clear from the above producing method, the sulfonic acid group of the internal olefin sulfonate of component (b1-4) is present inside the carbon chain of the internal olefin sulfonate, i.e., the olefin chain or alkane chain, and component (b1-4) may also partially include trace amounts of compounds in which the sulfonic acid group is present at the end of the carbon chain.

Note that a mass ratio between HAS species and IOS species in the compound of component (b1-4) can be measured by high-performance liquid chromatography mass spectrometry (hereinafter abbreviated as HPLC-MS). Specifically, the mass ratio can be determined from HPLC-MS peak areas for component (b1-4).

Note that a content of component (b1-4) in the present invention is calculated by assuming that component (b1-4) is a potassium salt.

$R^{1b}$ in the general formula (b1-1) represents an alkyl group with preferably 9 or more, more preferably 10 or more and further preferably 12 or more, and preferably 18 or less, more preferably 16 or less and further preferably 14 or less carbons from the viewpoints of washing performance and foam suppressing performance. $R^{1b}$ is preferably a straight alkyl group.

m in the general formula (b1-1) is preferably 0 or more, more preferably 1 or more and further preferably 2 or more, and preferably 4 or less and more preferably 3 or less from the viewpoints of washing performance and foam suppressing performance.

n in the general formula (b1-1) is preferably 0.5 or more, more preferably 1 or more and further preferably 2 or more, and preferably 10 or less, more preferably 5 less and further preferably 4 or less from the viewpoints of washing performance and foam suppressing performance.

M in the general formula (b1-1) represents preferably a hydrogen atom, an alkali metal such as sodium, potassium or the like, an alkaline earth metal (½ atom) such as magnesium, calcium or the like, or an organic ammonium. An organic ammonium salt may be a salt of an amine used as a pH adjuster. M is more preferably an alkali metal such as sodium, potassium or the like or an alkanol ammonium such as monoethanolammonium, diethanolammonium or the like and further preferably sodium from the viewpoints of washing performance and foam suppressing performance.

Component (b1-1) is preferably a polyoxyalkylene alkyl ether sulfate sodium salt, wherein an alkyl group has 12 or more and 14 or less carbons, an average number of added moles of propyleneoxy groups is 0 or more and 4 or less, and an average number of added moles of ethyleneoxy groups is 1 or more and 4 or less from the viewpoints of washing performance and foam suppressing performance. In other words, component (b1-1) is preferably a compound of the general formula (b1-1) in which $R^{1b}$ represents an alkyl group with 12 or more and 14 or less carbons, m is 0 or more and 4 or less, n is 1 or more and 4 or less, and M represents sodium.

$R^{2b}$ in the general formula (b1-2) represents an alkyl group with 9 or more, preferably 10 or more and more preferably 11 or more, and preferably 18 or less, more preferably 16 or less and further preferably 14 or less carbons from the viewpoints of washing performance and foam suppressing performance.

M in the general formula (b1-2) represents preferably a hydrogen atom, an alkali metal such as sodium, potassium or the like, an alkaline earth metal (½ atom) such as magnesium, calcium or the like, or an organic ammonium from the viewpoints of washing performance and foam suppressing performance. An organic ammonium salt may be a salt of an amine used as a pH adjuster. M is more preferably an alkali metal such as sodium, potassium or the like or an alkanol ammonium such as monoethanolammonium, diethanolammonium or the like and further preferably sodium from the viewpoints of washing performance and foam suppressing performance.

From the viewpoints of washing performance and foam suppressing performance, component (b1-2) is preferably an alkylbenzene sulfonate, wherein an alkyl group has 11 or more and 14 or less carbons, and more preferably an alkylbenzene sulfonate sodium salt, wherein an alkyl group has 11 or more and 14 or less carbons. In other words, component (b1-2) is preferably a compound of the general formula (b1-2) in which $R^{2b}$ represents an alkyl group with 11 or more and 14 or less carbons, and M represents sodium.

$R^{3b}$ in the general formula (b1-3) represents an alkyl group with preferably 8 or more, more preferably 10 or more and further preferably 11 or more, and preferably 18 or less, more preferably 16 or less and further preferably 14 or less carbons from the viewpoints of washing performance and foam suppressing performance.

$R^{4b}$ in the general formula (b1-3) represents an alkyl group with 1 or more, and preferably 5 or less and more preferably 4 or less carbons from the viewpoints of washing performance and foam suppressing performance.

M in the general formula (b1-3) represents preferably a hydrogen atom, an alkali metal such as sodium, potassium or the like, an alkaline earth metal (½ atom) such as magnesium, calcium or the like, or an organic ammonium salt from the viewpoints of washing performance and foam suppressing performance. An organic ammonium salt may be a salt of an amine used as a pH adjuster. M is more preferably an alkali metal such as sodium, potassium or the like or an alkanol ammonium such as monoethanolammonium, diethanolammonium or the like and further preferably sodium.

Component (b1-3) is preferably a compound of the general formula (b1-3) in which $R^{3b}$ represents an alkyl group with 11 or more and 14 or less carbons, $R^{4b}$ represents an alkyl group with 1 or more and 5 or less carbons, and M represents sodium from the viewpoints of washing performance and foam suppressing performance.

Examples of the internal olefin sulfonate of component (b1-4) include an alkali metal salt, an alkaline earth metal (½ atom) salt, an ammonium salt or an organic ammonium salt. Examples of the alkali metal salt include a sodium salt and a potassium salt. Examples of the organic ammonium salt include an alkanol ammonium salt with 2 or more and 6 or less carbons including any of the alkanol amines described later. The organic ammonium salt also includes a salt of an amine. The internal olefin sulfonate is preferably an alkali metal salt and more preferably a sodium salt or a potassium salt from the viewpoints of washing performance and foam suppressing performance.

The internal olefin sulfonate of component (b1-4) has 14 or more and preferably 16 or more carbons from the viewpoint of washing performance, and preferably 22 or less, more preferably 20 or less and further preferably 18 or less carbons from the viewpoint of foam suppressing performance. Note that the carbon number of the internal olefin sulfonate of component (b1-4) represents the carbon number of the internal olefin that forms a covalent bond with the sulfonic acid salt.

In the internal olefin sulfonate of component (b1-4), a content of an internal olefin sulfonate with the sulfonic acid group present at position 5 or more and preferably position 5 or more and 9 or less is preferably 5 mass % or more, more preferably 10 mass % or more, further preferably 15 mass % or more and furthermore preferably 20 mass % or more, and preferably 60 mass % or less, more preferably 55 mass % or less, further preferably 45 mass % or less and furthermore preferably 40 mass % or less from the viewpoints of washing performance and foam suppressing performance.

In the internal olefin sulfonate of component (b1-4), a mass ratio of a content of an internal olefin sulfonate with the sulfonic acid group present at position 2 or more and 4 or less [hereinafter sometimes referred to as (IO-1S)] to a content of an internal olefin sulfonate with the sulfonic acid group present at position 5 or more and preferably position 5 or more and 9 or less [hereinafter sometimes referred to as (IO-2S)], (IO-1S)/(IO-2S), is preferably 0.5 or more, more preferably 0.8 or more, further preferably 1.0 or more, furthermore preferably 1.5 or more, furthermore preferably 2 or more, furthermore preferably 2.5 or more, furthermore preferably 3 or more, furthermore preferably 4 or more and furthermore preferably 4.5 or more from the viewpoints of washing performance and foam suppressing performance, and preferably 10 or less, more preferably 8 or less and further preferably 6 or less from the viewpoints of washing performance and foam suppressing performance.

Note that the content of each compound that the position of the sulfonic acid group is different from one another in component (b1-4) can be measured by HPLC-MS. In the present specification, the content of each compound that the position of the sulfonic acid group is different from one another is determined as a mass ratio based on the HPLC-MS peak areas of the compounds each having the sulfonic acid group at each position in the entire HAS species of component (b1-4).

In component (b1-4), a content of an olefin sulfonate with the sulfonic acid group present at position 1 in component (b1-4) is preferably 10 mass % or less, more preferably 7 mass, or less, further preferably 5 mass, or less and furthermore preferably 3 mass % or less from the viewpoints of washing performance and foam suppressing performance, and preferably 0.01 mass % or more from the viewpoints of reduction of production costs and improvement of productivity.

The position of the sulfonic acid group in these compounds is the position in the olefin chain or alkane chain.

The internal olefin sulfonate of component (b1-4) can be a mixture of hydroxy species and olefin species. A mass ratio of a content of olefin species of an internal olefin sulfonate to a content of hydroxy species of an internal olefin sulfonate in component (b1-4) (olefin species/hydroxy species) can be 0/100 or more and further 5/95 or more, and 50/50 or less, further 40/60 or less, further 30/70 or less and further 25/75 or less.

A mass ratio of a content of olefin species of an internal olefin sulfonate to a content of hydroxy species of an internal olefin sulfonate in component (b1-4) can be measured by HPLC-MS.

Component (b1-4) can be produced by sulfonating, neutralizing and hydrolyzing, for example, an internal olefin with 18 carbons as a raw material. The sulfonation reaction can be carried out by reacting 1.0 to 1.2 mol of sulfur trioxide gas with 1 mol of the internal olefin. It can be carried out at a reaction temperature of 20 to 40° C.

The neutralization is carried out by reacting an aqueous alkali solution such as potassium hydroxide, ammonia, 2-aminoethenol or the like in an amount 1.0 to 1.5 molar times the theoretic value for a sulfonic acid group. The hydrolysis reaction may be carried out in the presence of water at 90 to 200° C. for 30 minutes to 3 hours. These reactions can be carried out in succession. Further, after the reactions are completed, purification can be carried out by extraction, washing or the like.

Component (b2) is one or more nonionic surfactants selected from an aliphatic alcohol alkoxylate and an aliphatic ester alkoxylate. It is preferably one or more nonionic surfactants selected from fatty acid methyl ester ethoxylates from the viewpoint of foam suppressing performance.

Examples of the aliphatic alcohol alkoxylate include, for example, an alkylene oxide adduct of an aliphatic alcohol and a terminal methyl ether adduct thereof.

Examples of the aliphatic alcohol include an aliphatic alcohol having an aliphatic hydrocarbon group with preferably 9 or more, more preferably 10 or more and further preferably 12 or more, and preferably 18 or less, more preferably 16 or less and further preferably 14 or less carbons from the viewpoints of washing performance and foam suppressing performance. The aliphatic alcohol is preferably a primary alcohol from the viewpoints of washing performance and foam suppressing performance.

From the viewpoints of washing performance and foam suppressing performance, examples of the aliphatic hydrocarbon group include an alkyl group and an alkenyl group, and an alkyl group is preferable.

The aliphatic hydrocarbon group is a straight chain or a branched chain and preferably a straight chain from the viewpoints of washing performance and foam suppressing performance.

The alkylene oxide is preferably one or more selected from ethylene oxide and propylene oxide from the viewpoints of washing performance and foam suppressing performance. When the alkylene oxide includes ethylene oxide and propylene oxide, they may be bonded in blocks or bonded at random.

An average number of added moles of alkylene oxides is preferably 1 or more, more preferably 5 or more and further preferably 10 or more, and preferably 70 or less, more preferably 50 or less and further preferably 30 or less from the viewpoints of washing performance and foam suppressing performance.

Further, examples of the aliphatic ester alkoxylate include, for example, an alkylene oxide adduct of a fatty acid and a terminal methyl ether adduct thereof.

Examples of the fatty acid include a fatty acid having an aliphatic hydrocarbon group with preferably 9 or more, more preferably 10 or more, further preferably 12 or more, furthermore preferably 14 or more and furthermore preferably 16 or more, and preferably 20 or less and more preferably 18 or less carbons from the viewpoints of washing performance and foam suppressing performance.

From the viewpoints of washing performance and foam suppressing performance, examples of the aliphatic hydrocarbon group include an alkyl group and an alkenyl group, and an alkyl group is preferable.

The aliphatic hydrocarbon group is a straight chain or a branched chain and preferably a straight chain from the viewpoints of washing performance and foam suppressing performance.

The alkylene oxide is preferably one or more selected from ethylene oxide and propylene oxide and more preferably ethylene oxide from the viewpoints of washing performance and foam suppressing performance. When the alkylene oxide includes ethylene oxide and propylene oxide, they may be bonded in blocks or bonded at random.

An average number of added moles of alkylene oxides is preferably 1 or more, more preferably 5 or more and further preferably 10 or more, and preferably 50 or less, more preferably 35 or less and further preferably 20 or less from the viewpoints of washing performance and foam suppressing performance.

Examples of component (b2) include a nonionic surfactant represented by the following general formula (b2), $$R^{5b}—(CO)_mO-(AO)_n—R^{6b} \quad \text{(b2)}$$

wherein $R^{5b}$ represents an aliphatic hydrocarbon group with 9 or more and 18 or less carbons, $R^{6b}$ represents a hydrogen atom or a methyl group, CO represents a carbonyl group, m is a number of 0 or 1, AO represents one or more alkyleneoxy groups selected from an alkyleneoxy group with 2 carbons and an alkyleneoxy group with 3 carbons, with the proviso that when AO includes an ethyleneoxy group and a propyleneoxy group, ethyleneoxy groups and propyleneoxy groups may be bonded in blocks or bonded at random, and n represents an average number of added moles, which is a number of 1 or more and 70 or less.

$R^{5b}$ in the general formula (b2) has 9 or more, preferably 10 or more and more preferably 12 or more, and 18 or less, preferably 16 or less and more preferably 14 or less carbons from the viewpoints of washing performance and foam suppressing performance. From the viewpoints of washing performance and foam suppressing performance, examples of $R^{5b}$ include an alkyl group or an alkenyl group, and an alkyl group is preferable. The aliphatic hydrocarbon group may be a straight chain or a branched chain and is preferably a straight chain from the viewpoints of washing performance and foam suppressing performance.

$R^{6b}$ represents a hydrogen atom or a methyl group and preferably a hydrogen atom from the viewpoints of washing performance and foam suppressing performance. A methyl group is preferable from the viewpoint of foam suppressing performance.

n in the general formula (b2) is 1 or more, preferably 5 or more and more preferably 10 or more, and 70 or less, preferably 50 or less and more preferably 25 or less from the viewpoints of washing performance and foam suppressing performance.

m in the general formula (b2) is a number of 0 or 1, preferably 0 from the viewpoint of washing performance and preferably 1 from the viewpoint of foam suppressing performance. $R^{6b}$ may be a methyl group when m is 1.

AO in the general formula (b2) represents one or more alkyleneoxy groups selected from an alkyleneoxy group with 2 carbons and an alkyleneoxy group with 3 carbons. When AO includes an ethyleneoxy group and a propyleneoxy group, ethyleneoxy groups and propyleneoxy groups may be bonded in blocks or bonded at random. Further, ethyleneoxy groups and propyleneoxy groups are bonded in an arbitrary order.

In the general formula (b2), an average degree of polymerization (or sometimes also referred to as an average number of added moles) of ethyleneoxy groups (hereinafter sometimes referred to as EO group) is preferably 3 or more, more preferably 5 or more and further preferably 10 or more, and preferably 70 or less, more preferably 50 or less and further preferably 25 or less from the viewpoints of washing performance and foam suppressing performance.

In the general formula (b2), an average degree of polymerization (or sometimes also referred to as an average number of added moles) of propyleneoxy groups (hereinafter sometimes also referred to as PO group) is preferably 0 or more, more preferably 1 or more and further preferably 2 or more from the viewpoint of foam suppressing performance, and preferably 5 or less and more preferably 4 or less from the viewpoints of washing performance and foam suppressing performance.

When AO in the general formula (b2) includes EO group and PO group, EO group and PO group may be bonded at random or bonded in blocks, and are preferably bonded in blocks and more preferably bonded in blocks in the order of EOPOEO or in the order of POEO with respect to an alkyl ether (for example, $R^{5b}$—O in the general formula (b2)) from the viewpoint of foam suppressing performance.

Examples of a compound represented by the general formula (b2) include, for example, a polyoxyethylene (polyoxypropylene) alkyl ether, wherein an alkyl group is derived from a straight primary or secondary alcohol with preferably 12 or more, and preferably 14 or less and more preferably 12 carbons.

Examples of the water containing a hardness component include, for example, tap water, drinking water (mineral water), hot spring water and groundwater. The balance of the treatment liquid of the present invention excluding components (a) and (b) and the optional components described later may be water.

Examples of the hardness component include calcium and magnesium, and an amount of all the hardness components included in the water is expressed in terms of a concentration of a calcium compound in a unit volume of water in German hardness, American hardness or the like. German hardness represents an amount of CaO equivalent to an amount of all the hardness components by milligrams per 100 milliliters of water (unit: ° DH), and American hardness represents an amount of $CaCO_3$ equivalent to an amount of all the hardness components by milligrams per liter (unit: ppm). They have the following relationship: American hardness (ppm) =German hardness (° DH)×17.85.

From the viewpoint of foam suppressing performance, examples of the hardness component include calcium and magnesium, and calcium is more preferable.

A temperature of the water containing a hardness component is preferably 0° C. or more and more preferably 5° C. or more, and preferably 60° C. or less, more preferably 50° C. or less and further preferably 40° C. or less from the viewpoint of foam suppressing performance.

A concentration of component (a) in the treatment liquid of the present invention is preferably 1 ppm or more, more preferably 5 ppm or more and further preferably 10 ppm or more from the viewpoint of foam suppressing performance, and preferably 3000 ppm or less, more preferably 2000 ppm or less, further preferably 1000 ppm or less, furthermore preferably 500 ppm or less, furthermore preferably 250 ppm or less and furthermore preferably 100 ppm or less from the viewpoint of washing performance. Note that, in the present invention, ppm is a unit for expressing a mass proportion (the same applies to ppm below).

A concentration of component (b) in the treatment liquid of the present invention is preferably 5 ppm or more, more preferably 10 ppm or more, further preferably 50 ppm or more, furthermore preferably 100 ppm or more and furthermore preferably 150 ppm or more from the viewpoint of washing performance, and preferably 1000 ppm or less, more preferably 500 ppm or less and further preferably 250 ppm or less from the viewpoint of foam suppressing performance.

A total concentration of components (a) and (b) in the treatment liquid of the present invention is preferably 5 ppm or more, more preferably 6 ppm or more, further preferably 10 ppm or more, furthermore preferably 100 ppm or more and furthermore preferably 200 ppm or more from the viewpoint of foam suppressing performance, and preferably 4000 ppm or less, more preferably 3000 ppm or less, further preferably 2000 ppm or less, furthermore preferably 1000 ppm or less, furthermore preferably 500 ppm or less and furthermore preferably 250 ppm or less from the viewpoint of washing performance.

A proportion of a content of component (a) to a total content of components (a) and (b) in the treatment liquid of the present invention, (a)/[(a)+(b)], is preferably more than 0 mass %, more preferably 0.1 mass % or more, further preferably 1 mass % or more and furthermore preferably 5 mass % or more from the viewpoint of foam suppressing performance, and preferably 50 mass % or less, more preferably 45 mass % or less and further preferably 40 mass % or less from the viewpoint of washing performance. In the present invention, a mass percentage expressing a proportion represents a value of a predetermined proportion as a percentage (the same applies hereinafter).

When the treatment liquid of the present invention includes component (b1), a proportion of a content of component (a) to a total content of components (a) and (b1) in the treatment liquid, (a)/[(a)+(b1)], is more than 0 mass %, preferably 1 mass % or more, more preferably 5 mass % or more, further preferably 10 mass % or more and furthermore preferably 20 mass or more from the viewpoint of foam suppressing performance, and 50 mass % or less, preferably 40 mass % or less, more preferably 35 mass % or less and further preferably 30 mass % or less from the viewpoint of washing performance. These proportions can be applied to requirement (1).

When the treatment liquid of the present invention includes component (b2), a proportion of a content of component (a) to a total content of components (a) and (b2) in the treatment liquid, (a)/[(a)+(b2)], is more than 0 mass %, preferably 1 mass % or more, more preferably 5 mass % or more, further preferably 10 mass % or more, furthermore preferably 20 mass % or more and furthermore preferably 30 mass % or more from the viewpoint of foam suppressing performance, and 45 mass % or less, preferably 40 mass % or less and more preferably 35 mass % or less from the viewpoint of washing performance. These proportions can be applied to requirement (2).

When the treatment liquid of the present invention includes components (b1) and (b2), at least one of a proportion of a content of component (a) to a total content of components (a) and (b1), (a)/[(a)+(b1)], and a proportion of a content of component (a) to a total content of components (a) and (b2), (a)/[(a)+(b2)], in the treatment liquid should fall within the above range.

When the treatment liquid of the present invention includes components (b1) and (b2), both a proportion of a content of component (a) to a total content of components (a) and (b1), (a)/[(a)+(b1)], and a proportion of a content of component (a) to a total content of components (a) and (b2), (a)/[(a)+(b2)], preferably fall within the above ranges.

A concentration of hardness components in the treatment liquid of the present invention can be selected from preferably 5 ppm or more, more preferably 10 ppm or more and further preferably 25 ppm or more from the viewpoint of foam suppressing performance, and for example, 1000 ppm or less, further 500 ppm or less, further 250 ppm or less, further 150 ppm or less and further 50 ppm or less from the viewpoint of washing performance.

In general, water including hardness components is more likely to form foam at a lower hardness, but the method for treating a textile product of the present invention can suppress foam formation even in such a hardness region that foam is more likely to be formed.

Further, in the water containing a hardness component, a concentration of the harness component preferably falls within this hardness component concentration range.

A total concentration of a dicarboxylic acid with 12 or more carbons and a salt thereof in the treatment liquid of the present invention is less than 100 ppm, preferably 50 ppm or less and more preferably 25 ppm or less, and may be 0 ppm from the viewpoint of foam suppressing performance. This dicarboxylic acid may be a dicarboxylic acid with 12 or more and further 14 or more, and 20 or less and further 16 or less carbons. Further, this dicarboxylic acid may be a succinic acid having an alkyl group or an alkenyl group with 8 or more and further 10 or more, and 16 or less and further 12 or less carbons or a salt thereof.

The treatment liquid of the present invention may be a treatment liquid that does not include a total of 100 ppm or more, further 50 ppm or more and further 25 ppm or more of a dicarboxylic acid with 14 or more and 16 or less carbons and a salt thereof from the viewpoint of foam suppressing performance. The treatment liquid of the present invention may be a treatment liquid in which the total concentration of a dicarboxylic acid with 14 or more and 16 or less carbons and a salt thereof is 0 ppm, in other words, which does not include a dicarboxylic acid with 14 or more and 16 or less carbons and a salt thereof.

The treatment liquid of the present invention may be a treatment liquid that does not include a total of 100 ppm or more, further 50 ppm or more and further 25 ppm or more of a dicarboxylic acid with 12 or more and 20 or less carbons and a salt thereof from the viewpoint of foam suppressing performance.

Further, the treatment liquid of the present invention may be a treatment liquid that does not include a total of 100 ppm or more, further 50 ppm or more and further 25 ppm or more of a succinic acid having an alkyl group or an alkenyl group with 8 or more and further 10 or more, and 16 or less and further 12 or less carbons or a salt thereof from the viewpoint of foam suppressing performance.

Further, a total proportion of a dicarboxylic acid with 14 or more and 16 or less carbons and a salt thereof in all the anionic surfactants included in the treatment liquid of the present invention may be preferably 30 mass % or less, more preferably 25 mass % or less and further preferably 10 mass % or less from the viewpoint of foam suppressing performance.

Examples of a dicarboxylic acid with 14 or more and 16 or less carbons or a salt thereof include, for example, 2-dodecenylsuccinate (a dicarboxylic acid with 16 carbons), 2-decylsuccinate (a dicarboxylic acid with 14 carbons) or the like.

A hardness of the treatment liquid of the present invention can be selected from preferably 0.01° DH or more, more preferably 0.1° DH or more and further preferably 1° DH or more from the viewpoint of foam suppressing performance, and for example, 50° DH or less, further 40° DH or less, further 30° DH or less, 20° DH or less, further 15° DH or less, further 10° DH or less and further 5° DH or less from the viewpoint of washing performance.

In general, water including hardness components is more likely to form foam at a lower hardness, but the method for treating a textile product of the present invention can suppress foam formation even in such a hardness region that foam is more likely to be formed.

Further, a hardness of the water containing a hardness component preferably falls within this hardness range.

The treatment liquid of the present invention may include a metal ion derived from an inorganic salt other than the hardness component. When the treatment liquid of the present invention includes a metal ion derived from an inorganic salt other than the hardness component, a total concentration of the metal ion derived from an inorganic salt and the metal ion derived from the hardness component may be preferably 1 ppm or more, more preferably 5 ppm or more, further preferably 10 ppm or more and furthermore preferably 25 ppm or more from the viewpoint of foam suppressing performance, and preferably 1000 ppm or less, more preferably 500 ppm or less, further preferably less than 500 ppm, furthermore preferably 250 ppm or less, furthermore preferably 150 ppm or less and furthermore preferably 50 ppm or less from the viewpoints of washing performance and foam suppressing performance.

Further, a concentration of the metal ion derived from an inorganic salt, further derived from an inorganic alkali metal salt and further derived from an alkali metal chloride in the treatment liquid of the present invention may be preferably 1 ppm or more, more preferably 5 ppm or more, further preferably 10 ppm or more and furthermore preferably 25 ppm or more from the viewpoint of foam suppressing performance, and preferably 1000 ppm or less, more preferably 500 ppm or less, further preferably less than 500 ppm, furthermore preferably 250 ppm or less, furthermore preferably 150 ppm or less and furthermore preferably 50 ppm or less from the viewpoints of washing performance and foam suppressing performance. Examples of the metal ion may include a sodium ion and a potassium ion, and a total concentration of a sodium ion and a potassium ion preferably falls within the above range. Examples of the inorganic salt include, for example, sodium chloride, potassium chloride or the like.

In the treatment liquid of the present invention, a proportion of the metal ion derived from the hardness component to the metal ions included in the treatment liquid is preferably more than 0 mass %, more preferably 10 mass % or more, further preferably 25 mass % or more, furthermore preferably 50 mass % or more, furthermore preferably 75 mass % or more and furthermore preferably less than 100 mass % from the viewpoint of foam suppressing performance. Here, being less than 100 mass % refers to the case where the metal ion left over after excluding the metal ions derived from components (a) and (b) from the metal ions included in the treatment liquid is the metal ion derived from the hardness component included in the water. A proportion of the metal ion derived from the hardness component to a total of the metal ion derived from an inorganic salt and the metal ion derived the hardness component in the treatment liquid of the present invention preferably falls within the above range.

The treatment liquid of the present invention can include a surfactant other than components (a) and (b) [hereinafter referred to as component (x)]. Examples of component (x) include one or more surfactants selected from a nonionic surfactant other than component (b2), a cationic surfactant and an amphoteric surfactant.

Examples of the nonionic surfactant other than component (b2) include polyethylene glycol-type nonionic surfactants such as polyoxyethylene sorbitan fatty acid esters, polyoxyethylene sorbitol fatty acid esters, polyoxyethylene glycerin fatty acid esters, polyoxyethylene alkyl phenyl ethers, polyoxyalkylene (hardened) castor oil or the like, polyhydric alcohol-type nonionic surfactants such as sucrose fatty acid esters, polyglycerin alkyl ethers, polyglycerin fatty acid esters, alkyl glycosides or the like, and fatty acid alkanol amides.

Examples of the cationic surfactant include cationic surfactants that are tertiary amine salts and cationic surfactants that are quaternary ammonium salts.

Examples of the amphoteric surfactant include betaine-type amphoteric surfactants and amine oxide-type amphoteric surfactants.

Examples of the betaine-type amphoteric surfactants include the following: alkyl imidazolium betaines such as 2-alkyl-N-carboxymethyl-N-hydroxyethyl imidazolinium betaines such as 2-lauryl-N-carboxymethyl-N-hydroxyethyl imidazolinium betaine, 2-myristyl-N-carboxymethyl-N-hydroxyethyl imidazolinium betaine or the like and others; alkyl dimethylaminoacetic acid betaines such as lauryl dimethylaminoacetic acid betaine, myristyl dimethylaminoacetic acid betaine, stearyl dimethylaminoacetic acid betaine and others; fatty acid amidopropyl betaines such as lauric acid amidopropyl betaine, myristic acid amidopropyl betaine, coconut oil fatty acid amidopropyl betaine and others; and hydroxysulfobetaines such as alkyl hydroxysulfobetaines such as lauryl hydroxysulfobetaine, coconut oil hydroxysulfobetaine or the like, fatty acid amidopropyl hydroxysulfobetaines such as lauric acid amidopropyl hydroxysulfobetaine, coconut oil fatty acid amidopropyl hydroxysulfobetaine or the like and others, etc.

Examples of the amine oxide-type amphoteric surfactants include alkyldimethylamine oxides such as octyldimethylamine oxide, lauryldimethylamine oxide, myristyldimethylamine oxide or the like.

A proportion of a total content of components (a) and (b) in all the surfactants included in the treatment liquid of the present invention may be preferably 60 mass- or more, more preferably 70 mass % or more and further preferably 80 mass or more from the viewpoint of washing performance, and preferably 100 mass % or less, 95 mass % or less and 90 mass % or less from the viewpoints of washing performance and foam suppressing performance. A total surfactant amount in the present invention may be a total content of components (a), (b) and (x) in the treatment liquid of the present invention.

The treatment liquid of the present invention may optionally include organic solvents, pH adjusters, fragrances, antibacterial agents, bleaching agents, bleach activators, defoamers, fragrance capsules, enzymes, polymers, silicone or the like. As a pH adjuster, for example, an alkali agent such as monoethanolamine or the like or an acid agent such as citric acid or the like can be used.

[Method for Treating Textile Product]

The present invention provides a method for treating a textile product including, treating the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein the treatment liquid satisfies at least one of the following requirements (1) and (2), requirement (1): a proportion of a content of component (a) to a total content of components (a) and (b1) in the treatment liquid is more than 0 mass % and 50 mass- or less, and requirement (2): a proportion of a content of component (a) to a total content of components (a) and (b2) in the treatment liquid is more than 0 mass % and 45 mass' or less.

In the method for treating a textile product of the present invention, components (a) and (b) or the like described in the treatment liquid of the present invention can be preferably used, and a preferable content (concentration) of each component, preferable content proportions or the like are also the same as those in the treatment liquid of the present invention.

The treatment liquid of the present invention can be preferably used in the method for treating a textile product of the present invention. In other words, the method for treating a textile product of the present invention may be a method for treating a textile product including, treating the textile product with the treatment liquid of the present invention, and thereafter rinsing the textile product with water.

The treatment in the method for treating a textile product of the present invention may be bringing the textile product into contact with the treatment liquid of the present invention.

Further, the method for treating a textile product of the present invention may be a method for washing a textile product including, washing the textile product with a washing liquid and thereafter rinsing the textile product with water, the washing liquid being obtained by mixing components (a) and (b) with water containing a hardness component, wherein the washing liquid satisfies at least one of the above requirements (1) and (2).

In other words, the present invention provides a method for washing a textile product including, washing the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein the treatment liquid satisfies at least one of the following requirements (1) and (2), requirement (1): a proportion of a content of component (a) to a total content of components (a) and (b1) in the treatment liquid is more than 0 mass % and 50 mass % or less, and requirement (2): a proportion of a content of component (a) to a total content of components (a) and (b2) in the treatment liquid is more than 0 mass % and 45 mass % or less.

The method for treating a textile product of the present invention can be carried out by using, for example, a washing machine for home use or a washing machine for commercial use. As conditions for that, commonly used temperature, washing time, number of rinses, bath ratio, pH or the like can be employed.

Even if oil stains such as sebum or the like or particle stains such as mud or the like are present in the system, the method for treating a textile product of the present invention can maintain washing performance for these stains and maintain foam suppressing performance of the treatment liquid.

A temperature of the water containing a hardness component is preferably 0° C. or more and more preferably 5° C. or more, and preferably 60° C. or less, more preferably 50° C. or less and further preferably 40° C. or less from the viewpoint of foam suppressing performance. A temperature of the treatment liquid preferably falls within this range from the same viewpoint.

A period of time during which the textile product is treated is preferably 1 minute or more and more preferably 5 minutes or more, and preferably 30 minutes or less from the viewpoints of foam suppressing performance and washing performance.

A number of rinses of the textile product optionally carried out after the treatment of the textile product is preferably 1 time or more and preferably 5 times or less from the viewpoints of foam suppressing performance and surfactant residuality.

A bath ratio when the treatment liquid is used for the treatment of the textile product is preferably 1 or more, more preferably 2.5 or more and further preferably 5 or more from the viewpoint of washing performance, and preferably 40 or less, more preferably 30 or less and further preferably 20 or less from the viewpoint of foam suppressing performance.

In the method for treating a textile product of the present invention, the treatment liquid used for the treatment can maintain foam suppressing performance without hindering the effect of washing performance in the pH range of 1 to 14.

The method for treating a textile product of the present invention can be directed to textile products including various fibers, for example, natural fibers, synthetic fibers and semi-synthetic fibers. For example, the fibers may be fibers of cloth.

The method for treating a textile product of the present invention can be carried out, for example, by incorporating it into a laundering process for textile products such as clothing or the like. Here, the laundering process may refer to treatments including washing, rinsing and dehydration of textile products. In the present invention, in any of these treatments in the laundering process, the treatment liquid of the present invention can be applied to a textile product such that components (a) and (b) satisfy a predetermined requirement.

The fibers may be either hydrophobic fibers or hydrophilic fibers. Examples of the hydrophobic fibers include, for example, protein fibers (milk protein casein fiber, promix or the like), polyamide fibers (nylon or the like), polyester fibers (polyester or the like), polyacrylonitrile fibers (acrylic or the like), polyvinyl alcohol fibers (vinylon or the like), polyvinyl chloride fibers (polyvinyl chloride or the like), polyvinylidene chloride fibers (vinylidene or the like), polyolefin fibers (polyethylene, polypropylene or the like), polyurethane fibers (polyurethane or the like), polyvinyl chloride/polyvinyl alcohol copolymer fibers (polyclar or the like), polyalkylene paraoxybenzoate fibers (benzoate or the like), polyfluoroethylene fibers (polytetrafluoroethylene or the like) and others.

Examples of the hydrophilic fibers include, for example, seed hair fibers (cotton, kapok or the like), bast fibers (hemp, flax, ramie, cannabis, jute or the like), vein fibers (manila hemp, sisal hemp or the like), palm fibers, juncus, straw, animal hair fibers (wool, mohair, cashmere, camel hair, alpaca, vicuna, angora or the like), silk fibers (domestic silk, wild silk), feathers, cellulose fibers (rayon, polynosic, cupro, acetate or the like) and others.

The fibers are preferably fibers including cotton fiber from the viewpoint of foam suppressing performance. A content of cotton fiber in the fibers is preferably 5 mass % or more, more preferably 10 mass % or more, further preferably 15 mass % or more, furthermore preferably 20 mass- or more and furthermore preferably 100 mass % from the viewpoint of foam suppressing performance.

In the present invention, a textile product means fabrics such as woven fabrics, knitted fabrics, nonwoven fabrics or the like using any of the above hydrophobic fibers or hydrophilic fibers, and products such as undershirts, T-shirts, dress shirts, blouses, slacks, caps, handkerchiefs, towels, knitwear, socks, underwear, tights, masks or the like obtained by using them. The textile product is preferably a textile product including cotton fiber from the viewpoint of foam suppressing performance. A preferable aspect of a content of cotton fiber in the textile product is the same as that of the above content of cotton fiber in the fibers.

[Foaming Reducing Method]

The present invention provides a foaming reducing method for reducing foaming of a treatment liquid during treatment of a textile product with the treatment liquid, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein components (a) and (b) are used such that at least one of the following requirements (1) and (2) is satisfied, requirement (1): a proportion of a content of component (a) to a total content of components (a) and (b1) in the treatment liquid is more than 0 mass % and 50 mass % or less, and requirement (2): a proportion of a content of component (a) to a total content of components (a) and (b2) in the treatment liquid is more than 0 mass % and 45 mass- or less.

In the foaming reducing method of the present invention, components (a) and (b) or the like described in the treatment liquid of the present invention can be preferably used, and a preferable content (concentration) of each component, preferable content proportions or the like are also the same as those in the treatment liquid of the present invention. The treatment liquid of the present invention can be preferably used in the foaming reducing method of the present invention.

In the foaming reducing method of the present invention, the treatment of the textile product may be bringing the textile product into contact with the treatment liquid of the present invention. Further, the textile product may be rinsed with water after brought into contact with the treatment liquid of the present invention.

The foaming reducing method of the present invention may be a method for reducing foaming of the treatment liquid of the present invention when the textile product is brought into contact with the treatment liquid.

<Treatment Agent>

The treatment liquid of the present invention may be a treatment liquid obtained by mixing a treatment agent including components (a) and (b) with water containing a hardness component.

The treatment agent of the present invention contains components (a) and (b). Further, the treatment agent can optionally contain component (x). The preferable aspects of components (a), (b) and (x) in the treatment agent are the same as those stated in the treatment liquid of the present invention.

The treatment agent of the present invention contains component (a) in an amount of preferably 1 mass % or more, more preferably 2.5 mass % or more and further preferably 5 mass % or more from the viewpoint of foam suppressing performance, and preferably 50 mass % or less, more preferably 40 mass % or less and further preferably 30 mass % or less from the viewpoint of washing performance.

The treatment agent of the present invention contains component (b) in an amount of preferably 5 mass % or more, more preferably 10 mass % or more and further preferably 20 mass % or more from the viewpoint of washing performance, and preferably 90 mass % or less, more preferably 80 mass % or less, further preferably 70 mass % or less, furthermore preferably 60 mass % or less and more preferably 50 mass % or less from the viewpoint of quality stability.

A total concentration of components (a) and (b) in the treatment agent of the present invention is preferably 5 mass % or more, more preferably 10 mass % or more, further preferably 20 mass % or more and furthermore preferably 30 mass % or more from the viewpoint of washing performance, and preferably 100 mass % or less, more preferably 95 mass, or less and further preferably 90 mass or less from the viewpoint of stability.

A proportion of a content of component (a) to a total content of components (a) and (b) in the treatment agent of the present invention, (a)/[(a)+(b)], is preferably more than 0 mass %, more preferably 0.1 mass % or more, further preferably 1 mass, or more and furthermore preferably 5 mass % or more from the viewpoint of foam suppressing performance, and preferably 50 mass % or less, more preferably 45 mass or less and further preferably 40 mass % or less from the viewpoint of washing performance.

When the treatment agent of the present invention includes component (b1), a proportion of a content of component (a) to a total content of components (a) and (b1) in the treatment agent, (a)/[(a)+(b1)], is more than 0 mass %, preferably 1 mass % or more, more preferably 5 mass % or more, further preferably 10 mass % or more and furthermore preferably 20 mass % or more from the viewpoint of foam suppressing performance, and 50 mass % or less, preferably 40 mass % or less, more preferably 35 mass % or less and further preferably 30 mass % or less from the viewpoint of washing performance. These proportions can be applied to requirement (1).

When the treatment agent of the present invention includes component (b2), a proportion of a content of component (a) to a total content of components (a) and (b2) in the treatment agent, (a)/[(a)+(b2)], is more than 0 mass %, preferably 1 mass % or more, more preferably 5 mass % or more, further preferably 10 mass % or more, furthermore preferably 20 mass % or more and furthermore preferably 30 mass, or more from the viewpoint of foam suppressing performance, and 45 mass % or less, preferably 40 mass % or less and more preferably 35 mass % or less from the viewpoint of washing performance. These proportions can be applied to requirement (2).

When the treatment agent of the present invention includes components (b1) and (b2), at least one of a proportion of a content of component (a) to a total content of components (a) and (b1), (a)/[(a)+(b1)], and a proportion of a content of component (a) to a total content of components (a) and (b2), (a)/[(a)+(b2)], in the treatment agent should fall within the above range.

When the treatment agent of the present invention includes components (b1) and (b2), both a proportion of a content of component (a) to a total content of components (a) and (b1), (a)/[(a)+(b1)], and a proportion of a content of component (a) to a total content of components (a) and (b2), (a)/[(a)+(b2)], preferably fall within the above ranges.

When the treatment agent of the present invention contains component (x), a content of component (x) in the treatment agent is preferably 0.1 mass % or more and more preferably 0.5 mass % or more, and preferably 30 mass % or less and more preferably 20 mass % or less.

A proportion of a total content of components (a) and (b) in all the surfactants included in the treatment agent of the present invention may be preferably 60 mass % or more, more preferably 70 mass % or more and further preferably 80 mass % or more from the viewpoint of washing performance, and preferably 100 mass % or less, 95 mass % or less and 90 mass % or less from the viewpoints of washing performance and foam suppressing performance. A total surfactant amount in the present invention may be a total content of components (a), (b) and (x) in the composition.

The treatment agent of the present invention may optionally include organic solvents, pH adjusters, fragrances, antibacterial agents, bleaching agents, bleach activators, defoamers, fragrance capsules, enzymes, polymers, silicone or the like. As a pH adjuster, for example, an alkali agent such as monoethanolamine or the like or an acid agent such as citric acid or the like can be used.

In addition to the above embodiments, the present invention discloses the aspects below.

<1>

A method for treating a textile product including, treating the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein the treatment liquid satisfies at least one of the following requirements (1) and (2), requirement (1): a proportion of a content of component (a) to a total content of components (a) and (b1) in the treatment liquid is more than 0 mass % and 50 mass % or less, and requirement (2): a proportion of a content of component (a) to a total content of components (a) and (b2) in the treatment liquid is more than 0 mass % and 45 mass % or less.

<2>

The method for treating a textile product according to <1>, wherein the hydrocarbon group of component (a) includes a branched chain.

<3>

The method for treating a textile product according to <1> or <2>, wherein the hydrocarbon groups of component (a) have 20 or more carbons in total.

<4>

The method for treating a textile product according to any of <1> to <3>, wherein component (a) is a compound represented by the following general formula (a1):

(a1)

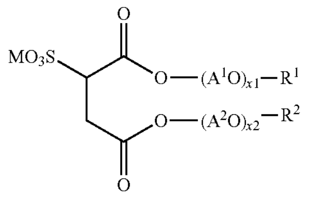

wherein $R^1$ and $R^2$ each represent a branched hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

<5>

The method for treating a textile product according to <4>, wherein the hydrocarbon groups of $R^1$ and $R^2$ in the general formula (a1) are alkyl groups or alkenyl groups.

<6>

The method for treating a textile product according to <4> or <5>, wherein the hydrocarbon groups of $R^1$ and $R^2$ in the general formula (a1) have preferably 6 or more, more preferably 8 or more and further preferably 10 or more, and preferably 15 or less and more preferably 12 or less carbons.

<7>

The method for treating a textile product according to any of <4> to <6>, wherein the branched hydrocarbon groups of $R^1$ and $R^2$ in the general formula (a1) have a side chain with preferably 2 or more and more preferably 3 or more, and preferably 10 or less, more preferably 8 or less and further preferably 6 or less carbons, and $R^1$ and $R^2$ in the general formula (a1) are preferably branched alkyl groups with 8 or more and 12 or less carbons, more preferably branched alkyl groups with 10 or more and 12 or less carbons and further preferably branched alkyl groups with 10 carbons.

<8>

The method for treating a textile product according to any of <4> to <7>, wherein branched alkyl groups of $R^1$ and $R^2$ in the general formula (a1) are preferably groups selected from 2-ethylhexyl group and 2-propylheptyl group and more preferably 2-propylheptyl groups.

<9>

The method for treating a textile product according to any of <4> to <8>, wherein $A^1O$ and $A^2O$ in the general formula (a1) each represent an alkyleneoxy group with 2 or more and 4 or less carbons and preferably with 2 or 3 carbons, and x1 and x2 in the general formula (a1) represent average numbers of added moles of $A^1O$ and $A^2O$, and each represent a number of 0 or more and 10 or less, preferably 6 or less, more preferably 4 or less and further preferably 2 or less, and furthermore preferably 0.

<10>

The method for treating a textile product according to any of <4> to <9>, wherein M in the general formula (a1) represents preferably an alkali metal ion or an alkanol ammonium ion, more preferably a sodium ion, a potassium ion, a triethanolammonium ion, a diethanolammonium ion or a monoethanolammonium ion and further preferably a sodium ion.

<11>

The method for treating a textile product according to any of <1> to <10>, wherein component (b1) is an anionic surfactant (excluding component (a)), and further, one or more compounds selected from compound (b1-1) represented by the following general formula (b1-1) [hereinafter referred to as component (b1-1)], compound (b1-2) represented by the following general formula (b1-2) [hereinafter referred to as component (b1-2)], compound (b1-3) represented by the following general formula (b1-3) [hereinafter referred to as component (b1-3)] and an internal olefin sulfonate with 14 or more and 24 or less carbons [hereinafter referred to as component (b1-4)], $$R^{1b}—O—[(PO)_m(EO)_n]—SO_3M \quad (b1\text{-}1)$$

wherein in the formula (b1-1), $R^{1b}$ represents an alkyl group with 8 or more and 22 or less carbons, in which a carbon atom bonded to the oxygen atom is a primary carbon atom, PO represents a propyleneoxy group, EO represents an ethyleneoxy group, EO and PO are bonded in blocks or bonded at random, PO and EO are bonded in an arbitrary order, m and n represent average numbers of added moles of PO and EO, where m is 0 or more and 5 or less and n is 0 or more and 16 or less, and M represents a hydrogen atom, an alkali metal, an alkaline earth metal (½ atom), ammonium or an organic ammonium, $$R^{2b}—B—SO_3M \quad (b1\text{-}2)$$

wherein in the formula (b1-2), $R^{2b}$ represents an alkyl group with 9 or more and 21 or less carbons, B represents a benzene ring, a carbon atom of $R^{2b}$ bonded to a carbon atom of B is a secondary carbon atom, M represents a hydrogen atom, an alkali metal, an alkaline earth metal (½ atom), ammonium or an organic ammonium, and a sulfonic acid group is bonded in an ortho, meta or para position relative to $R^{2b}$ bonded to B, $$R^{3b}\text{—}CH(SO_3M)COOR^{4b} \quad (b1\text{-}3)$$

wherein in the formula (b1-3), $R^{3b}$ represents an alkyl group with 6 or more and 20 or less carbons, $R^{4b}$ represents an alkyl group with 1 or more and 6 or less carbons, and M represents a hydrogen atom, an alkali metal, an alkaline earth metal (½ atom), ammonium or an organic ammonium.

<12>

The method for treating a textile product according to <11>, wherein $R^{1b}$ in the general formula (b1-1) represents a straight alkyl group with preferably 9 or more, more preferably 10 or more and further preferably 12 or more, and preferably 18 or less, more preferably 16 or less and further preferably 14 or less carbons.

<13>

The method for treating a textile product according to <11> or <12>, wherein m in the general formula (b1-1) is preferably 0 or more, more preferably 1 or more and further preferably 2 or more, and preferably 4 or less and more preferably 3 or less, and n in the general formula (b1-1) is preferably 0.5 or more, more preferably 1 or more and further preferably 2 or more, and preferably 10 or less, more preferably 5 or less and further preferably 4 or less.

<14>

The method for treating a textile product according to any of <11> to <13>, wherein in the general formula (b1-1), $R^{1b}$ represents an alkyl group with 12 or more and 14 or less carbons, m is 0 or more and 4 or less, n is 1 or more and 4 or less, and M represents sodium.

<15>

The method for treating a textile product according to any of <11> to <14>, wherein $R^{2b}$ in the general formula (b1-2) represents an alkyl group with preferably 10 or more and more preferably 11 or more, and preferably 18 or less, more preferably 16 or less and further preferably 14 or less carbons.

<16>

The method for treating a textile product according to any of <11> to <15>, wherein in the general formula (b1-2), $R^{2b}$ represents an alkyl group with 11 or more and 14 or less carbons, and M represents sodium.

<17>

The method for treating a textile product according to any of <11> to <16>, wherein $R^{3b}$ in the general formula (b1-3) represents an alkyl group with preferably 8 or more, more preferably 10 or more and further preferably 11 or more, and preferably 18 or less, more preferably 16 or less and further preferably 14 or less carbons.

<18>

The method for treating a textile product according to any of <11> to <17>, wherein $R^{41}$ in the general formula (b1-3) represents an alkyl group with 1 or more, and preferably 5 or less and more preferably 4 or less carbons.

<19>

The method for treating a textile product according to any of <11> to <18>, wherein in the general formula (b1-3), $R^{3b}$ represents an alkyl group with 11 or more and 14 or less carbons, $R^{4b}$ represents an alkyl group with 1 or more and 5 or less carbons, and M represents sodium.

<20>

The method for treating a textile product according to any of <11> to <19>, wherein M in the general formulas (b1-1) to (b1-3) represents preferably a hydrogen atom, an alkali metal such as sodium, potassium or the like, an alkaline earth metal (½ atom) such as magnesium, calcium or the like or an organic ammonium, more preferably an alkali metal such as sodium, potassium or the like or an alkanol ammonium such as monoethanolammonium, diethanolammonium or the like and further preferably sodium.

<21>

The method for treating a textile product according to any of <11> to <20>, wherein component (b1-4) has preferably 16 or more, and preferably 22 or less, more preferably 20 or less and further preferably 18 or less carbons.

<22>

The method for treating a textile product according to any of <1> to <21>, wherein component (b2) is a nonionic surfactant represented by the following general formula (b2), $$R^{5b}\text{—}(CO)_mO\text{-}(AO)_n\text{—}R^{6b} \quad (b2)$$

wherein $R^{5b}$ represents an aliphatic hydrocarbon group with 9 or more and 18 or less carbons, $R^{6b}$ represents a hydrogen atom or a methyl group, CO represents a carbonyl group, m is a number of 0 or 1, AO represents one or more alkyleneoxy groups selected from an alkyleneoxy group with 2 carbons and an alkyleneoxy group with 3 carbons, with the proviso that when AO includes an ethyleneoxy group and a propyleneoxy group, ethyleneoxy groups and propyleneoxy groups may be bonded in blocks or bonded at random, and n represents an average number of added moles, which is a number of 1 or more and 70 or less.

<23>

The method for treating a textile product according to <22>, wherein $R^{5b}$ in the general formula (b2) has preferably 10 or more and more preferably 12 or more, and preferably 16 or less and more preferably 14 or less carbons.

<24>

The method for treating a textile product according to <22> or <23>, wherein m in the general formula (b2) is preferably 1 and more preferably 0.

<25>

The method for treating a textile product according to any of <22> to <24>, wherein n in the general formula (b2) represents an average number of added moles, which is preferably 1 or more, more preferably 5 or more and further preferably 10 or more, and 70 or less, preferably 50 or less and more preferably 25 or less.

<26>

The method for treating a textile product according to any of <22> to <25>, wherein an average number of added moles of ethyleneoxy groups (hereinafter sometimes referred to as EO group) in the general formula (b2) is preferably 3 or more, more preferably 5 or more and further preferably 10 or more, and preferably 70 or less, more preferably 50 or less and further preferably 25 or less.

<27>

The method for treating a textile product according to any of <22> to <26>, wherein an average number of added moles of propyleneoxy groups (hereinafter sometimes referred to as PO group) in the general formula (b2) is preferably 0 or more, more preferably 1 or more and further preferably 2 or more, and preferably 5 or less and more preferably 4 or less.

<28>

The method for treating a textile product according to any of <22> to <27>, wherein component (b2) is a polyoxyethylene (polyoxypropylene) alkyl ether of the general formula (b2), wherein EO and PO are bonded in blocks in the order of EOPOEO or in the order of POEO with respect to $R^{51}$-0, and an alkyl group is derived from a straight primary or secondary alcohol with preferably 12 or more, and preferably 14 or less and more preferably 12 carbons.

<29>

The method for treating a textile product according to any of <1> to <28>, wherein the water containing a hardness component includes a calcium ion or a magnesium ion.

<30>

The method for treating a textile product according to any of <1> to <29>, wherein a concentration of component (a) in the treatment liquid is preferably 1 ppm or more, more preferably 5 ppm or more and further preferably 10 ppm or more, and preferably 3000 ppm or less, more preferably 2000 ppm or less, further preferably 1000 ppm or less, furthermore preferably 500 ppm or less, furthermore preferably 250 ppm or less and furthermore preferably 100 ppm or less.

<31>

The method for treating a textile product according to any of <1> to <30>, wherein a concentration of component (b) in the treatment liquid is preferably 5 ppm or more, more preferably 10 ppm or more, further preferably 50 ppm or more, furthermore preferably 100 ppm or more and furthermore preferably 150 ppm or more, and preferably 1000 ppm or less, more preferably 500 ppm or less and further preferably 250 ppm or less.

<32>

The method for treating a textile product according to any of <1> to <31>, wherein a total concentration of components (a) and (b) in the treatment liquid is preferably 5 ppm or more, more preferably 6 ppm or more, further preferably 10 ppm or more, furthermore preferably 100 ppm or more and furthermore preferably 200 ppm or more, and preferably 4000 ppm or less, more preferably 3000 ppm or less, further preferably 2000 ppm or less, furthermore preferably 1000 ppm or less, furthermore preferably 500 ppm or less and furthermore preferably 250 ppm or less.

<33>

The method for treating a textile product according to any of <1> to <32>, wherein a proportion of a content of component (a) to a total content of components (a) and (b) in the treatment liquid, (a)/[(a)+(b)], is preferably more than 0 mass %, more preferably 0.1 mass or more, further preferably 1 mass % or more and furthermore preferably 5 mass % or more, and preferably 50 mass % or less, more preferably 45 mass % or less and further preferably 40 mass % or less.

<34>

The method for treating a textile product according to any of <1> to <33>, wherein a proportion of a content of component (a) to a total content of components (a) and (b1) in the treatment liquid, (a)/[(a)+(b1)], is preferably 1 mass % or more, more preferably 5 mass % or more, further preferably 10 mass % or more and furthermore preferably 20 mass % or more, and preferably 40 mass % or less, more preferably 35 mass % or less and further preferably 30 mass % or less.

<35>

The method for treating a textile product according to any of <1> to <34>, wherein a proportion of a content of component (a) to a total content of components (a) and (b2) in the treatment liquid, (a)/[(a)+(b2)], is preferably 1 mass % or more, more preferably 5 mass % or more, further preferably 10 mass % or more, furthermore preferably 20 mass % or more and furthermore preferably 30 mass, or more, and preferably 40 mass % or less and more preferably 35 mass, or less.

<36>

The method for treating a textile product according to any of <1> to <35>, wherein a total concentration of a dicarboxylic acid with 14 or more and 16 or less carbons and a salt thereof in the treatment liquid is preferably 50 ppm or less and more preferably 25 ppm or less.

<37>

The method for treating a textile product according to any of <1> to <36>, wherein when the treatment liquid includes a metal ion derived from an inorganic salt other than the hardness component, a total metal ion concentration in the treatment liquid is preferably 1 ppm or more, more preferably 5 ppm or more, further preferably 10 ppm or more and furthermore preferably 25 ppm or more, and preferably 1000 ppm or less, more preferably 500 ppm or less, further preferably less than 500 ppm, furthermore preferably 250 ppm or less, furthermore preferably 150 ppm or less and furthermore preferably 50 ppm or less.

<38>

The method for treating a textile product according to any of <1> to <37>, wherein a concentration of a metal ion derived from an inorganic salt, further derived from an inorganic alkali metal salt and further derived from an alkali metal chloride in the treatment liquid is preferably 1 ppm or more, more preferably 5 ppm or more, further preferably 10 ppm or more and furthermore preferably 25 ppm or more, and preferably 1000 ppm or less, more preferably 500 ppm or less, further preferably less than 500 ppm, furthermore preferably 250 ppm or less, furthermore preferably 150 ppm or less and furthermore preferably 50 ppm or less.

<39>

The method for treating a textile product according to any of <1> to <38>, wherein in the treatment liquid, a proportion of the metal ion derived from the hardness component to the metal ions included in the treatment liquid is preferably more than 0 mass %, more preferably 10 mass, or more, further preferably 25 mass % or more, furthermore preferably 50 mass % or more, furthermore preferably 75 mass or more and furthermore preferably less than 100 mass %.

<40>

A method for washing a textile product including, washing the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein the treatment liquid satisfies at least one of the following requirements (1) and (2), requirement (1): a proportion of a content of component (a) to a total content of components (a) and (b1) in the treatment liquid is more than 0 mass % and 50 mass or less, and requirement (2): a proportion of a content of component (a) to a total content of components (a) and (b2) in the treatment liquid is more than 0 mass % and 45 mass % or less.

<41>

A foaming reducing method for reducing foaming of a treatment liquid during treatment of a textile product with the treatment liquid, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a sulfosuccinic acid ester having a hydrocarbon group with 5 or more and 18 or less carbons or a salt thereof, and component (b): one or more surfactants selected from the following components (b1) and (b2), component (b1): an anionic surfactant (excluding component (a)), and component (b2): one or more nonionic surfactants selected from an aliphatic alcohol alkoxylate and an aliphatic ester alkoxylate, wherein components (a) and (b) are used such that at least one of the following requirements (1) and (2) is satisfied, requirement (1): a proportion of a content of component (a) to a total content of components (a) and (b1) in the treatment liquid is more than 0 mass % and 50 mass % or less, and requirement (2): a proportion of a content of component (a) to a total content of components (a) and (b2) in the treatment liquid is more than 0 mass % and 45 mass % or less.

EXAMPLES

The following components (a) and (b) were used for the preparation of treatment liquids.

<Component (a)>

(a-1) sodium di-2 ethylhexyl sulfosuccinate (a-2) sodium di-2-propylheptyl sulfosuccinate <Component (b)>

Component (b1)

(b1-1-1) a sodium polyoxyalkylene alkyl ether sulfate (EMAL 20C, manufactured by Kao Corporation)

(b1-1-2) a (polyoxypropylene) polyoxyethylene lauryl ether sulfate sodium salt, in which the alkyl group is derived from lauryl alcohol, the average number of added moles of propyleneoxy groups is 2, and the average number of added moles of ethyleneoxy groups is 2

(b1-2-1) a sodium alkylbenzene sulfonate (alkyl composition: $C_{10}/C_{11}/C_{12}/C_{13}$=11/29/34/26 (mass ratio), the mass average carbon number of the entire compound=17.75)

(b1-4-1) an internal olefin sulfonate potassium salt with 16 carbons obtained in the production example below (b1-4-2) an internal olefin sulfonate potassium salt with 18 carbons; the mass ratio of olefin species (potassium olefin sulfonates) to hydroxy species (potassium hydroxy alkane sulfonates) in this C18IOS is 16/84; the mass ratio in the sulfonic acid group position distribution of HAS species in this C18IOS is as follows: position 1/position 2/position 3/position 4/position 5/positions 6 to 9=1.5/22.1/17.2/21.8/13.5/23.9; and further, (IO-1S)/(IO-2S) is equal to 1.6 by mass ratio.

<Production Example of C16IOS>

C16IOS was obtained by using an internal olefin with 16 carbons referring to a method described in a production example of JP-A 2014-76988. In the obtained internal olefin sulfonate potassium salt C16IOS, the mass ratio of olefin species (potassium olefin sulfonates) to hydroxy species (potassium hydroxy alkane sulfonates) is 17/83. The mass proportion in the sulfonic acid group position distribution of hydroxy species in C16IOS was as follows: position 1/position 2/position 3/position 4/position 5/position 6/position 7/position 8=2.3%/23.6%/18.9%/17.5%/13.7%/11.2%/6.4%/6.4% (100 mass % in total). Further, (IO-1S)/(IO-2S) is nearly equal to 1.6 by mass ratio.

Component (b2)

(b2-1) a polyoxyethylene mixed-alkyl ether, in which a polyoxyethylene group (10) is bonded to a mixed alkyl group of an alkyl group with 12 carbons and an alkyl group with 14 carbons (7/3 by mass ratio). The average number of added moles of oxyethylene groups is shown in parenthesis.

(b2-2) a polyoxyethylene polyoxypropylene polyoxyethylene mixed-alkyl ether, in which a polyoxyethylene group (9), a polyoxypropylene group (2) and a polyoxyethylene group (9) are bonded to a mixed alkyl group of an alkyl group with 12 carbons and an alkyl group with 14 carbons (7/3 by mass ratio) in this order. The average numbers of added moles of oxyethylene groups and oxypropylene groups are shown in parenthesis.

(b2-3) a polyoxypropylene polyoxyethylene mixed-alkyl ether, in which a polyoxypropylene group (3.7) and a polyoxyethylene group (16.5) are bonded to a mixed alkyl group of an alkyl group with 12 carbons and an alkyl group with 14 carbons (7/3 by mass ratio) in this order. The average numbers of added moles of oxyethylene groups and oxypropylene groups are shown in parenthesis.

(b2-4) a fatty acid methyl ester ethoxylate, in which a fatty acid has 16 or more and 18 or less carbons, and the average number of added moles of ethyleneoxy groups is 15.

(Another Component)

2-decylsuccinate (a dicarboxylic acid with 14 carbons), trade name "2-decyl succinic acid" manufactured by Sigma-Aldrich

Examples 1 and 2 and Comparative Examples 1 and 2

<Preparation of Thick Surfactant>

First, thick surfactants including components (a) and (b) (hereinafter referred to as surfactants) were prepared by the method below. The content ratios for components (a) and (b) in each surfactant were as shown in Tables 1 to 3. Each surfactant was prepared such that the concentrations of components (a) and (b) in a 1000-fold dilution of the surfactant were as shown in Tables 1 to 3.

A Teflon® stirrer piece with a length of 5 cm was placed in a glass beaker with a capacity of 200 mL, and the mass of them was measured. Next, 20 g of ion exchange water at 20° C., and components (a) and (b) at proportions shown in Tables 1 to 3 were placed in the beaker in this order, and the top of the beaker was sealed with Saran Wrap®. The beaker having the contents therein was put in a water bath at 60° C. set on a magnetic stirrer, and the contents were stirred at 100 r/min for 30 minutes while keeping the temperature of water in the water bath within the temperature range of 60±2° C. After that, an adjustment to 25° C. was made, and a pH adjustment to a pH of 7 was made with an alkali agent (monoethanolamine) or an acid agent (citric acid). Next, after water in the water bath was replaced with tap water at 5° C. and the composition in the beaker was cooled to a temperature of 20° C., another component was further placed therein and stirred for 10 minutes. Next, Saran Wrap® was removed and ion exchange water was added such that the mass of the contents reached 200 g, and the contents were stirred again at 100 r/min for 5 minutes, thus obtaining the surfactants.

[pH Measurement Method]

A composite electrode for pH measurements (manufactured by HORIBA, Ltd., glass slide-in sleeve type) was connected to a pH meter (manufactured by HORIBA, Ltd., pH/ion meter F-23), and the power was turned on. A saturated potassium chloride aqueous solution (3.33 mol/L) was used as the internal solution for the pH electrode. Next, a pH 4.01 standard solution (phthalate standard solution), a pH 6.86 standard solution (neutral phosphate standard solution) and a pH 9.18 standard solution (borate standard solution) were each placed in a 100-mL beaker, and immersed in a constant temperature bath at 25° C. for 30 minutes. The electrode for pH measurements was immersed in the standard solutions at an adjusted constant temperature for 3 minutes to perform a calibration operation in the order of pH 6.86, pH 9.18 and pH 4.01. The temperature of a sample to be measured (a composition including components (a) and (b)) was adjusted to 25° C., the electrode of the pH meter was immersed in the sample, and the pH 1 minute later was measured.

<Method for Preparing Hardness Water>

(1) Preparation of Hardness Water (Ca/Mg=8:2 (Mass Ratio))

Calcium chloride dihydrate (FUJIFILM Wako Pure Chemical Corporation) and magnesium chloride hexahydrate (FUJIFILM Wako Pure Chemical Corporation) in an amount equivalent to a German hardness of 150° DH were weighed such that calcium ion/magnesium ion ratio (molar ratio) was 8/2, and the weighed compounds were dissolved in ion exchange water at 20° C., thus preparing a thick raw solution. This thick raw solution was diluted 100 times with ion exchange water, and the temperature thereof was adjusted to 5° C., thus obtaining hardness water.

<Method for Measuring German Hardness of Water>

German hardness measurements were carried out by the method below.

[Reagent]

0.01 mol/L EDTA-2Na solution: a 0.01 mol/L aqueous solution of disodium ethylenediaminetetraacetate (a solution for titration, 0.01 M EDTA-Na2, manufactured by Sigma-Aldrich Co. LLC)

Indicator Universal BT (product name: Universal BT, manufactured by DOJINDO LABORATORIES)

Ammonia buffer solution for hardness measurements (a solution obtained by dissolving 67.5 g of ammonium chloride in 570 ml of 28 w/v % ammonia water and making the total amount 1000 ml with ion exchange water)

[Method for Measuring Hardness]

First, 20 mL of water as a sample was collected in a conical beaker with a volumetric pipette, and 2 ml of the ammonia buffer solution for hardness measurements was added thereto. Further, 0.5 mL of indicator Universal BT was added thereto to confirm that the solution after the addition was reddish purple.

0.01 mol/L EDTA 2Na solution was added dropwise from a burette while shaking the conical beaker well, and the point of time when the sample water turned blue was taken as the end point of titration. The total hardness of the sample was determined by the following calculation formula from the titration amount T (mL) of EDTA 2Na solution:

$$\text{Hardness}(^\circ\text{dH}) = (T \times 0.01 \times F \times 56.0774 \times 100)/A$$

T: titration amount of 0.01 mol/L EDTA-2Na solution (mL)

A: volume of sample (20 mL, volume of sample water)

F: factor for 0.01 mol/L EDTA-2Na solution

<Method for Evaluating Washing Performance>

(1) Preparation of Model Sebum Artificial Stain Cloth

A model sebum artificial stain liquid of the composition shown below was adhered to cloth to prepare model sebum artificial stain cloth. The model sebum artificial stain liquid was printed on the cloth with a gravure roll coater, thereby adhering the artificial stain liquid to the cloth. The step of adhering the model sebum artificial stain liquid to the cloth to prepare the model sebum artificial stain cloth was carried out with a gravure roll cell capacity of 58 $cm^3/m^2$, a coating rate of 1.0 m/min, a drying temperature of 100° C. and a drying time of 1 minute. Cotton 2003 (manufactured by Tanigashira Shoten) was used as the cloth.

The composition of the model sebum artificial stain liquid was as follows: lauric acid 0.4 mass %, myristic acid 3.1 mass %, pentadecanoic acid 2.3 mass %, palmitic acid 6.2 mass %, heptadecanoic acid 0.4 mass %, stearic acid 1.6 mass %, oleic acid 7.8 mass %, triolein 13.0 mass-, n-hexadecyl palmitate 2.2 mass %, squalene 6.5 mass %, egg white lecithin liquid crystal 1.9 mass %, Kanuma red soil 8.1 mass, carbon black 0.01 mass %, and the balance of the composition was water (100 mass % in total).

(2) Method for Evaluating Washing Performance

Five pieces of the above prepared model sebum artificial stain cloth (6 cm×6 cm) were washed with a Terg-O-Tometer (Ueshima, MS-8212) at 85 rpm for 10 minutes. The washing was carried out by using each treatment liquid under the following washing conditions; the treatment liquid used was obtained by mixing a surfactant prepared by the above method with hardness water including $Ca^{2+}$ and $Mg^{2+}$ ions at the concentrations in Tables 1 to 3 such that the amount of the surfactant was 0.1 mass; and the water temperature was 20° C. After washing, rinsing with city water (3.5° DH, 20° C.) was carried out for 3 minutes. The hardness water was prepared by dissolving calcium chloride dihydrate (FUJIFILM Wako Pure Chemical Corporation) and magnesium chloride hexahydrate (FUJIFILM Wako Pure Chemical Corporation) in ion exchange water.

The reflectances at 550 nm of the original cloth before staining and before and after washing were measured with a colorimeter (manufactured by NIPPON DENSHOKU INDUSTRIES CO., LTD., Z-300A), and a washing rate (%) was calculated by the formula below. The average washing rate value was calculated for the five pieces of the stain cloth, and Tables 1 and 3 show those values. A treatment liquid with a higher washing rate is considered to be more excellent in washing performance.

$$\text{Washing rate}(\%) = 100 \times [(\text{reflectance after washing} - \text{reflectance before washing})/(\text{reflectance of original cloth} - \text{reflectance before washing})]$$

<Method for Evaluating Foam Suppressing Performance>

(1) Evaluation of Foam Suppressing Performance 50 mL of the hardness water prepared by the method for preparing hardness water described above was put in a screw tube bottle (No. 8), and 0.05 g of a surfactant prepared by the method for preparing surfactants described above was weighed and added dropwise thereto. The screw tube bottle was then covered, and shaken with a shaker (STRONG SHAKER SR-2DW, manufactured by TAITEC) at 300 rpm for 3 minutes, and the foam height (cm) 30 seconds after shaking was measured with a scale.

Foam suppressing performance was calculated by the formula below with the foam height in comparative example 1-5 as the reference in Table 1 and that in comparative example 2-1 as the reference in Tables 2 and 3. If a calculated value of foam suppressing performance is less than 1.0 and the value is lower, the treatment liquid is considered to be excellent in foam suppressing performance. A treatment liquid excellent in foam suppressing performance is also considered to be a composition excellent in rinsing performance. Further, if a calculated value of foam suppressing performance is more than 0, the treatment liquid is considered to maintain produced foam in a moderate manner.

Foam suppressing performance=(foam height for treatment liquid in example or comparative example (cm))/(foam height for reference treatment liquid (cm))

TABLE 1

| | | | | | Example | | | | | | | |
|---|---|---|---|---|---|---|---|---|---|---|---|---|
| | | | | | 1-1 | 1-2 | 1-3 | 1-4 | 1-5 | 1-6 | 1-7 | 1-8 |
| Treatment liquid | Concentration in treatment liquid (ppm) | (a) | | (a-1) | | 50 | | | | | | |
| | | | | (a-2) | 50 | | 20 | 75 | 90 | 50 | 50 | 50 |
| | | (b) | (b2) | (b2-1) | | 150 | 180 | 125 | 110 | 150 | | |
| | | | | (b2-2) | 150 | | | | | | | |
| | | | | (b2-3) | | | | | | | 150 | |
| | | | | (b2-4) | | | | | | | | 150 |
| | | | | $Ca^{2+}$ | 20 | 20 | 20 | 20 | 20 | 20 | 20 | 20 |
| | | | | $Mg^{2+}$ | 5 | 5 | 5 | 5 | 5 | 5 | 5 | 5 |
| | | | | Water | Balance | Balance | Balance | Balance | Balance | Balance | Balance | Balance |
| | | | | Total of surfactants | 200 | 200 | 200 | 200 | 200 | 200 | 200 | 200 |
| | | | | (a)/[(a) + (b1)] (mass %) | 100 | 100 | 100 | 100 | 100 | 100 | 100 | 100 |
| | | | | (a)/[(a) + (b2)] (mass %) | 25 | 25 | 10 | 37.5 | 45 | 25 | 25 | 25 |
| | | | | (a)/[(a) + (b)] (mass %) | 25 | 25 | 10 | 37.5 | 45 | 25 | 25 | 25 |
| Foam suppressing performance (−) | | | | | 0.6 | 0.9 | 0.7 | 0.6 | 0.5 | 0.6 | 0.6 | 0.2 |
| Washing rate (%) | | | | | 38.3 | 45.1 | 45.6 | 35.7 | 33.2 | 39.5 | 33.1 | 32.4 |

| | | | | | Comparative example | | | | | | | | |
|---|---|---|---|---|---|---|---|---|---|---|---|---|---|
| | | | | | 1-1 | 1-2 | 1-3 | 1-4 | 1-5 | 1-6 | 1-7 | 1-8 | 1-9 |
| Treatment liquid | Concentration in treatment liquid (ppm) | (a) | | (a-1) | | | | | | 200 | | | |
| | | | | (a-2) | | | | | | | 200 | 100 | 150 |
| | | (b) | (b2) | (b2-1) | 200 | 150 | | | | | | 100 | 50 |
| | | | | (b2-2) | | | 200 | | | | | | |
| | | | | (b2-3) | | | | 200 | | | | | |
| | | | | (b2-4) | | | | | 200 | | | | |
| | | | | $Ca^{2+}$ | 20 | 20 | 20 | 20 | 20 | 20 | 20 | 20 | 20 |
| | | | | $Mg^{2+}$ | 5 | 5 | 5 | 5 | 5 | 5 | 5 | 5 | 5 |
| | | | | Water | Balance | Balance | Balance | Balance | Balance | Balance | Balance | Balance | Balance |
| | | | | Total of surfactants | 200 | 150 | 200 | 200 | 200 | 200 | 200 | 200 | 200 |
| | | | | (a)/[(a) + (b1)] (mass %) | — | — | — | — | — | 100 | 100 | 100 | 100 |
| | | | | (a)/[(a) + (b2)] (mass %) | 0 | 0 | 0 | 0 | 0 | 100 | 100 | 50 | 75 |
| | | | | (a)/[(a) + (b)] (mass %) | 0 | 0 | 0 | 0 | 0 | 100 | 100 | 50 | 75 |
| Foam suppressing performance (−) | | | | | 1.2 | 1.1 | 1.2 | 1.0 | (Reference) | 1.0 | 0.4 | 0.4 | 0.4 |
| Washing rate (%) | | | | | 45.2 | 46.2 | 41.0 | 40.6 | 45.3 | 4.0 | 4.4 | 23.8 | 7.8 |

TABLE 2

| | | | | Example | | | | | | |
|---|---|---|---|---|---|---|---|---|---|---|
| | | | | 2-1 | 2-2 | 2-3 | 2-4 | 2-5 | 2-6 | 2-7 |
| Treatment liquid | Concentration in treatment liquid (ppm) | (a) | (a-1) | | | | 50 | | | |
| | | | (a-2) | 50 | 10 | 50 | | 50 | 50 | 5 |
| | | (b) (b2) | (b2-1) | | | | | | | |
| | | | (b2-3) | | | | | | | |
| | | (b1) | (b1-1-1) | | | | | 150 | | |
| | | | (b1-1-2) | | | | | | | 195 |
| | | | (b]-2-1) | | | | | | 150 | |
| | | | (b1-4-1) | 150 | | | | | | |
| | | | (b]-4-2) | | 190 | 150 | 150 | | | |
| | | 2-decylsuccinate (C14 dicarboxylic acid | | | | | | | | |
| | | $Ca^{2+}$ | | 20 | 20 | 20 | 20 | 20 | 20 | 20 |
| | | $Mg^{2+}$ | | 5 | 5 | 5 | 5 | 5 | 5 | 5 |
| | | Water | | Balance | Balance | Balance | Balance | Balance | Balance | Balance |
| | | Total of surfactants | | 200 | 250 | 200 | 200 | 200 | 200 | 250 |
| | | (a)/[(a) + (b1)] (mass %) | | 25 | 5 | 25 | 25 | 25 | 25 | 2.5 |
| | | (a)/[(a) + (b2)] (mass %) | | 100 | 100 | 100 | 100 | 100 | 100 | 100 |
| | | (a)/[(a) + (b)] (mass %) | | 25 | 5 | 25 | 25 | 25 | 25 | 2.5 |
| Foam suppressing performance (−) | | | | 0.4 | 0.9 | 0.7 | 0.7 | 0.7 | 0.7 | 0.9 |
| Washing rate (%) | | | | 37.1 | 38.6 | 26.4 | 26.5 | 36.8 | 25.0 | 40.1 |

| | | | | Example | | | | | | Comparative example |
|---|---|---|---|---|---|---|---|---|---|---|
| | | | | 2-8 | 2-9 | 2-10 | 2-11 | 2-12 | 2-13 | 2-1 |
| Treatment liquid | Concentration in treatment liquid (ppm) | (a) | (a-1) | | | | | | | |
| | | | (a-2) | 10 | 50 | 60 | 75 | 100 | 50 | |
| | | (b) (b2) | (b2-1) | | | | | | | 200 |
| | | | (b2-3) | | | | | | | |
| | | (b1) | (b1-1-1) | | | | | | | |
| | | | (b1-1-2) | 190 | 150 | 140 | 125 | 100 | 50 | |
| | | | (b]-2-1) | | | | | | | |
| | | | (b1-4-1) | | | | | | | |
| | | | (b]-4-2) | | | | | | 150 | |
| | | 2-decylsuccinate (C14 dicarboxylic acid | | | | | | | | |
| | | $Ca^{2+}$ | | 20 | 20 | 20 | 20 | 20 | 20 | 20 |
| | | $Mg^{2+}$ | | 5 | 5 | 5 | 5 | 5 | 5 | 5 |
| | | Water | | Balance | Balance | Balance | Balance | Balance | Balance | Balance |
| | | Total of surfactants | | 250 | 200 | 200 | 200 | 200 | 250 | 200 |
| | | (a)/[(a) + (b1)] (mass %) | | 5 | 25 | 30 | 37.5 | 50 | 20 | — |
| | | (a)/[(a) + (b2)] (mass %) | | 100 | 100 | 100 | 100 | 100 | 100 | 0 |
| | | (a)/[(a) + (b)] (mass %) | | 5 | 25 | 30 | 37.5 | 50 | 20 | 0 |
| Foam suppressing performance (−) | | | | 0.8 | 0.6 | 0.6 | 0.6 | 0.5 | 0.6 | (Reference) |
| Washing rate (%) | | | | 38.9 | 38.9 | 36.4 | 32.5 | 25.2 | 36.5 | 45.2 |

TABLE 3

| | | | | Example | | | Comparative example | | | |
|---|---|---|---|---|---|---|---|---|---|---|
| | | | | 2-14 | 2-15 | 2-16 | 2-1 | 2-2 | 2-3 | 2-4 |
| Treatment liquid | Concentration in treatment liquid (ppm) | (a) | (a-1) | | | 20 | | | | |
| | | | (a-2) | 50 | 50 | 30 | | | | |
| | | (b) (b2) | (b2-1) | | 50 | | 200 | | | |
| | | | (b2-3) | 50 | | | | | | |
| | | (bi) | (b1-1-1) | | | | | | | |
| | | | (b1-1-2) | | | | | | | |

TABLE 3-continued

| | | | | | | | | | | | |
|---|---|---|---|---|---|---|---|---|---|---|---|
| | | | | (b1-2-1) | | 150 | | | | | |
| | | | | (b1-4-1) | | | | | 200 | | |
| | | | | (b1-4-2) | 150 | | 150 | | | 200 | 250 |
| | | | | 2-decylsuccinate (C14 dicarboxylic acid) | | | | | | | |
| | | | | $Ca^{2+}$ | 20 | 20 | 20 | 20 | 20 | 20 | 20 |
| | | | | $Mg^{2+}$ | 5 | 5 | 5 | 5 | 5 | 5 | 5 |
| | | | | Water | Balance | Balance | Balance | Balance | Balance | Balance | Balance |
| | | | | Total of surfactants | 250 | 250 | 200 | 200 | 200 | 200 | 250 |
| | | | | (a)/[(a) + (b1)] (mass %) | 25 | 25 | 25 | — | 0 | 0 | 0 |
| | | | | (a)/[(a) + (b2)] (mass %) | 50 | 50 | 100 | 0 | — | — | — |
| | | | | (a)/[(a) + (b)] (mass %) | 20 | 20 | 25 | 0 | 0 | 0 | 0 |
| | | | | Foam suppressing performance (−) | 0.4 | 0.9 | 0.7 | (Reference) | 1.2 | 1.3 | 1.4 |
| | | | | Washing rate (%) | 37.8 | 31.8 | 25.6 | 45.2 | 40.8 | 40.4 | 28.7 |

| | | | | | Comparative example | | | | | | |
|---|---|---|---|---|---|---|---|---|---|---|---|
| | | | | | 2-5 | 2-6 | 2-7 | 2-8 | 2-9 | 2-10 | 2-11 |
| Treatment liquid | Concentration in treatment liquid (ppm) | (a) | | (a-1) | | | | | | | |
| | | | | (a-2) | | | | 110 | 150 | 150 | 50 |
| | | (b) | (b2) | (b2-1) | | | | | | | 50 |
| | | | | (b2-3) | | | | | | | |
| | | | (bi) | (b1-1-1) | 200 | | | | | | |
| | | | | (b1-1-2) | | | 200 | 90.0 | 50 | | |
| | | | | (b1-2-1) | | 200 | | | | 50 | 150 |
| | | | | (b1-4-1) | | | | | | | |
| | | | | (b1-4-2) | | | | | | | |
| | | | | 2-decylsuccinate (C14 dicarboxylic acid) | | | | | | | 100 |
| | | | | $Ca^{2+}$ | 20 | 20 | 20 | 20 | 20 | 20 | 20 |
| | | | | $Mg^{2+}$ | 5 | 5 | 5 | 5 | 5 | 5 | 5 |
| | | | | Water | Balance | Balance | Balance | Balance | Balance | Balance | Balance |
| | | | | Total of surfactants | 200 | 200 | 200 | 200 | 200 | 200 | 250 |
| | | | | (a)/[(a) + (b1)] (mass %) | 0 | 0 | 0 | 55 | 75 | 75 | 25 |
| | | | | (a)/[(a) + (b2)] (mass %) | — | — | — | 100 | 100 | 100 | 50 |
| | | | | (a)/[(a) + (b)] (mass %) | 0 | 0 | 0 | 55 | 75 | 75 | 20 |
| | | | | Foam suppressing performance (−) | 1.3 | 1.5 | 1.2 | 0.4 | 0.4 | 0.4 | 1.1 |
| | | | | Washing rate (%) | 43.0 | 25.1 | 40.2 | 24.1 | 23.8 | 9.8 | 31.7 |

Examples 3 and 4 and Comparative Examples 3 and 4

<Preparation of Thick Surfactant>

Thick surfactants including components (a) and (b) (hereinafter referred to as surfactants) were prepared by the same method as in examples 1 and 2. The ratios for the contents of components (a) and (b) in each surfactant were as shown in Tables 4 and 5.

<Method for Preparing Hardness Water>

(1) Method for Preparing Hardness Water Including any Species of Ion

Hardness waters including any of the ion species shown in Tables 4 and 5 were prepared by the following method. For each ion, sodium chloride (FUJIFILM Wako Pure Chemical Corporation), potassium chloride (FUJIFILM Wako Pure Chemical Corporation) or magnesium chloride hexahydrate (FUJIFILM Wako Pure Chemical Corporation) in an amount equivalent to the ionic strength of calcium water with a German hardness of 150° DH was weighed and dissolved in ion exchange water, thus preparing a thick raw solution for each ion. This thick raw solution was diluted 100 times with ion exchange water, and the temperature thereof was adjusted to 5° C., thus obtaining hardness waters.

<Method for Evaluating Foam Suppressing Performance>

(1) Evaluation of Foam Suppressing Performance 50 mL of each hardness water prepared by the method for preparing hardness water described above was put in a screw tube bottle (No. 8), and 0.05 g of a surfactant prepared by the method for preparing surfactants described above was weighed and added dropwise thereto. The screw tube bottle was then covered, and shaken with a shaker (STRONG SHAKER SR-2DW, manufactured by TAITEC) at 300 rpm for 3 minutes, and the foam height (cm) 30 seconds after shaking was measured with a scale.

Foam suppressing performance was calculated by the formula for calculating foam suppressing performance described above with the foam height in comparative example 3-1 as the reference in Table 4 and that in comparative example 4-1 as the reference in Table 5. If a calculated value of foam suppressing performance is less than 1.0 and the value is lower, the treatment liquid is considered to be excellent in foam suppressing performance. A treatment liquid excellent in foam suppressing performance is also considered to be a composition excellent in rinsing performance.

TABLE 4

| | | | | Example | | | Comparative example | | |
|---|---|---|---|---|---|---|---|---|---|
| | | | | 3-1 | 3-2 | 3-3 | 3-1 | 3-2 | 3-3 |
| Treatment liquid | Concentration in treatment liquid (ppm) | (a) | (a-1) | | | | | | |
| | | (b) | (a-2) | 50 | 50 | 50 | 50 | 50 | 50 |
| | | | (b2) (b2-1) | 150 | 150 | 150 | 150 | 150 | 150 |
| | | Ion species | Hardness component $Ca^{2+}$ | 30 | | 30 | | | |
| | | | Hardness component $Mg^{2+}$ | | 30 | | | | |
| | | | $Na^+$ | | | 500 | | 30 | |
| | | | $K^+$ | | | | | | 30 |
| | | | Water | Balance | Balance | Balance | Balance | Balance | Balance |
| Total of surfactants | | | | 200 | 200 | 200 | 200 | 200 | 200 |
| (a)/[(a) + (b1)] (mass %) | | | | 100 | 100 | 100 | 100 | 100 | 100 |
| (a)/[(a) + (b2)] (mass %) | | | | 25 | 25 | 25 | 25 | 25 | 25 |
| (a)/[(a) + (b)] (mass %) | | | | 25 | 25 | 25 | 25 | 25 | 25 |
| Foam suppressing performance (−) | | | | 0.5 | 0.8 | 0.9 | (Reference) | 1.0 | 1.0 |

TABLE 5

| | | | | Example | | Comparative example | | |
|---|---|---|---|---|---|---|---|---|
| | | | | 4-1 | 4-2 | 4-1 | 4-2 | 4-3 |
| Treatment liquid | Concentration in treatment liquid (ppm) | (a) | (a-1) | | | | | |
| | | (b) | (a-2) | 50 | 50 | 50 | 50 | 50 |
| | | | (b1) (b1-1-2) | 150 | 150 | 150 | 150 | 150 |
| | | Ion species | Hardness component $Ca^{2+}$ | 30 | | | | |
| | | | Hardness component $Mg^{2+}$ | | 30 | | | |
| | | | $Na^+$ | | | | 30 | |
| | | | $K^+$ | | | | | 30 |
| | | | Water | Balance | Balance | Balance | Balance | Balance |
| Total of surfactants | | | | 200 | 200 | 200 | 200 | 200 |
| (a)/[(a) + (b1)] (mass %) | | | | 25 | 25 | 25 | 25 | 25 |
| (a)/[(a) + (b2)] (mass %) | | | | 100 | 100 | 100 | 100 | 100 |
| (a)/[(a) + (b)] (mass %) | | | | 25 | 25 | 25 | 25 | 25 |
| Foam suppressing performance (−) | | | | 0.5 | 0.8 | (Reference) | 1.0 | 1.0 |

The invention claimed is:

1. A method for treating a textile product comprising, treating the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a compound comprising a cation and bis-2-propylheptyl sulfosuccinate as an anion; and component (b): one or more surfactants selected from the following components (b1) and (b2), component (b1): at least one anionic surfactant (excluding component (a)) selected from the group consisting of:

a sodium polyoxyalkylene alkyl ether sulfate, a (polyoxypropylene) polyoxyethylene lauryl ether sulfate sodium salt, a sodium alkylbenzene sulfonate, and an internal olefin sulfonate potassium salt, and component (b2): one or more nonionic surfactants selected from the group consisting of:

a polyoxyethylene mixed-alkyl ether, a polyoxyethylene-polyoxypropylene-polyoxyethylene mixed-alkyl ether, and a polyoxypropylene-polyoxyethylene mixed-alkyl ether, wherein the treatment liquid satisfies at least one of the following requirements (1) and (2), requirement (1): a proportion of a content of the component (a) to a total content of the components (a) and (b1) in the treatment liquid is 2.5 mass % to 50 mass %, and requirement (2): a proportion of a content of the component (a) to a total content of the components (a) and (b2) in the treatment liquid is 10 mass % to 45 mass %.

2. The method for treating a textile product according to claim 1, wherein the water comprises a calcium ion or a magnesium ion.

3. The method for treating a textile product according to claim 1, wherein a concentration of a metal ion derived from an inorganic salt in the treatment liquid is less than 500 ppm.

4. A method for washing a textile product, comprising washing the textile product with a treatment liquid and thereafter rinsing the textile product with water, the treatment liquid being obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a compound comprising a cation and bis-2-propylheptyl sulfosuccinate as an anion; and component (b): one or more surfactants selected from the following components (b1) and (b2), component (b1): at least one anionic surfactant (excluding component (a)) selected from the group consisting of:

a sodium polyoxyalkylene alkyl ether sulfate, a (polyoxypropylene) polyoxyethylene lauryl ether sulfate sodium salt, a sodium alkylbenzene sulfonate, and an internal olefin sulfonate potassium salt, and component (b2): one or more nonionic surfactants selected from the group consisting of:

a polyoxyethylene mixed-alkyl ether, a polyoxyethylene-polyoxypropylene-polyoxyethylene mixed-alkyl ether, and a polyoxypropylene-polyoxyethylene mixed-alkyl ether, wherein the treatment liquid satisfies at least one of the following requirements (1) and (2), requirement (1): a proportion of a content of the component (a) to a total content of the components (a) and (b1) in the treatment liquid is 2.5 mass % to 50 mass %, and requirement (2): a proportion of a content of the component (a) to a total content of the components (a) and (b2) in the treatment liquid is 10 mass % to 45 mass %.

5. A method for reducing foaming during treatment of a textile product, comprising treating with a treatment liquid obtained by mixing the following components (a) and (b) with water containing a hardness component, provided that the treatment liquid does not include a total of 100 ppm or more of a dicarboxylic acid with 14 or more and 16 or less carbons and a salt thereof, component (a): a compound comprising a cation and bis-2-propylheptyl sulfosuccinate as an anion; and component (b): one or more surfactants selected from the following components (b1) and (b2), component (b1): at least one anionic surfactant (excluding component (a)) selected from the group consisting of:

a sodium polyoxyalkylene alkyl ether sulfate, a (polyoxypropylene) polyoxyethylene lauryl ether sulfate sodium salt, a sodium alkylbenzene sulfonate, and an internal olefin sulfonate potassium salt, and component (b2): one or more nonionic surfactants selected from the group consisting of:

a polyoxyethylene mixed-alkyl ether, a polyoxyethylene-polyoxypropylene-polyoxyethylene mixed-alkyl ether, and a polyoxypropylene-polyoxyethylene mixed-alkyl ether, wherein the components (a) and (b) are used such that at least one of the following requirements (1) and (2) is satisfied, requirement (1): a proportion of a content of the component (a) to a total content of the components (a) and (b1) in the treatment liquid is 2.5 mass % to 50 mass %, and requirement (2): a proportion of a content of the component (a) to a total content of the components (a) and (b2) in the treatment liquid is 10 mass % to 45 mass %.

6. The method for treating a textile product according to claim 1, wherein the compound comprising bis-2-propylheptyl sulfosuccinate is sodium bis-2-propylheptyl sulfosuccinate.

7. The method for washing a textile product according to claim 4, wherein the compound comprising bis-2-propylheptyl sulfosuccinate is sodium bis-2-propylheptyl sulfosuccinate.

8. The method for reducing foaming during treatment of a textile product according to claim 5, wherein the compound comprising bis-2-propylheptyl sulfosuccinate is sodium bis-2-propylheptyl sulfosuccinate.

* * * * *